(12) United States Patent
Schick et al.

(10) Patent No.: US 11,651,160 B2
(45) Date of Patent: *May 16, 2023

(54) SYSTEMS AND METHODS FOR USING MACHINE LEARNING AND RULES-BASED ALGORITHMS TO CREATE A PATENT SPECIFICATION BASED ON HUMAN-PROVIDED PATENT CLAIMS SUCH THAT THE PATENT SPECIFICATION IS CREATED WITHOUT HUMAN INTERVENTION

(71) Applicant: Specifio, Inc., Ojai, CA (US)

(72) Inventors: Ian C. Schick, Ojai, CA (US); Kevin Knight, Marina del Rey, CA (US)

(73) Assignee: Specifio, Inc., Ojai, CA (US)

( * ) Notice: Subject to any disclaimer, the term of this patent is extended or adjusted under 35 U.S.C. 154(b) by 665 days.

This patent is subject to a terminal disclaimer.

(21) Appl. No.: 16/739,655

(22) Filed: Jan. 10, 2020

(65) Prior Publication Data

US 2020/0151393 A1    May 14, 2020

Related U.S. Application Data

(63) Continuation of application No. 16/510,074, filed on Jul. 12, 2019, now Pat. No. 10,572,600, which is a
(Continued)

(51) Int. Cl.
*G06F 40/00* (2020.01)
*G06F 40/30* (2020.01)
(Continued)

(52) U.S. Cl.
CPC ............ *G06F 40/30* (2020.01); *G06F 40/137* (2020.01); *G06F 40/284* (2020.01); *G06F 40/56* (2020.01);
(Continued)

(58) Field of Classification Search
CPC ...... G06F 40/10; G06F 40/103; G06F 40/106; G06F 40/131; G06F 40/146; G06F 40/20;
(Continued)

(56) References Cited

U.S. PATENT DOCUMENTS

| 5,774,833 A | 6/1998 | Newman |
| 5,799,325 A | 8/1998 | Rivette |

(Continued)

OTHER PUBLICATIONS

Marinica, C., & Guillet, F. (2010). Knowledge-based interactive postmining of association rules using ontologies. IEEE Transactions on knowledge and data engineering, 22(6), 784-797 (Year: 2010).*
(Continued)

*Primary Examiner* — Edgar X Guerra-Erazo
(74) *Attorney, Agent, or Firm* — Esplin & Associates, PC

(57) ABSTRACT

Systems and methods for using machine learning and rules-based algorithms to create a patent specification based on human-provided patent claims such that the patent specification is created without human intervention are disclosed. Exemplary implementations may: obtain a claim set; obtain a first data structure representing the claim set; obtain a second data structure; obtain a third data structure; and determine one or more sections of the patent specification based on the first data structure, the second data structure, and the third data structure.

20 Claims, 10 Drawing Sheets

Related U.S. Application Data continuation of application No. 15/892,679, filed on Feb. 9, 2018, now Pat. No. 10,417,341.

(60) Provisional application No. 62/459,199, filed on Feb. 15, 2017, provisional application No. 62/459,235, filed on Feb. 15, 2017, provisional application No. 62/459,357, filed on Feb. 15, 2017, provisional application No. 62/459,208, filed on Feb. 15, 2017, provisional application No. 62/459,246, filed on Feb. 15, 2017.

(51) Int. Cl.
*G06Q 10/10* (2023.01)
*G06Q 50/18* (2012.01)
*G06F 40/56* (2020.01)
*G06F 40/137* (2020.01)
*G06F 40/284* (2020.01)
*G06N 20/00* (2019.01)

(52) U.S. Cl.
CPC ........... *G06Q 10/10* (2013.01); *G06Q 50/184* (2013.01); *G06N 20/00* (2019.01)

(58) Field of Classification Search
CPC .... G06F 40/211; G06F 40/232; G06F 40/242; G06F 40/247; G06F 40/253; G06F 40/263; G06F 40/268; G06F 40/274; G06F 40/289; G06F 40/30
See application file for complete search history.

(56) References Cited

U.S. PATENT DOCUMENTS

| | | | |
|---|---|---|---|
| 6,014,663 A | 1/2000 | Rivette | |
| 6,049,811 A | 4/2000 | Petruzzi | |
| 6,434,580 B1 | 8/2002 | Takano | |
| 7,890,851 B1 | 2/2011 | Milton, Jr. | |
| 8,041,739 B2 | 10/2011 | Glasgow | |
| 8,843,821 B2 | 9/2014 | Tran | |
| 9,195,647 B1 | 11/2015 | Zhang | |
| 9,454,731 B1 | 9/2016 | Lee | |
| 9,542,360 B2 | 1/2017 | Tran | |
| 9,547,640 B2 * | 1/2017 | Bostick | G06F 40/289 |
| 9,600,566 B2 | 3/2017 | Ganti | |
| 9,607,058 B1 | 3/2017 | Gupta | |
| 9,734,137 B2 | 8/2017 | Burchett | |
| 9,836,805 B2 | 12/2017 | Rau | |
| 9,906,515 B1 | 2/2018 | Tillman | |
| 9,946,895 B1 | 4/2018 | Kruse | |
| 9,990,351 B2 | 6/2018 | Tran | |
| 10,073,890 B1 | 9/2018 | Khamis | |
| 10,242,066 B2 | 3/2019 | Lundberg | |
| 10,417,341 B2 | 9/2019 | Schick | |
| 10,469,425 B1 | 11/2019 | Conley | |
| 10,572,600 B2 | 2/2020 | Schick | |
| 10,621,371 B1 | 4/2020 | Schick | |
| 10,713,443 B1 | 7/2020 | Knight | |
| 10,747,953 B1 | 8/2020 | Priyadarshi | |
| 10,839,149 B2 | 11/2020 | Gururajan | |
| 11,023,662 B2 | 6/2021 | Schick | |
| 11,341,323 B1 | 5/2022 | Donahue, III | |
| 2001/0049707 A1 | 12/2001 | Tran | |
| 2003/0065637 A1 | 4/2003 | Glasgow | |
| 2005/0144177 A1 | 6/2005 | Hodes | |
| 2005/0210042 A1 | 9/2005 | Goedken | |
| 2005/0261891 A1 | 11/2005 | Chan | |
| 2005/0278623 A1 | 12/2005 | Dehlinger | |
| 2006/0190807 A1 | 8/2006 | Tran | |
| 2007/0174039 A1 | 7/2007 | Lin | |
| 2007/0276796 A1 | 11/2007 | Sampson | |
| 2008/0147656 A1 | 6/2008 | Kahn | |
| 2008/0281860 A1 | 11/2008 | Elias | |
| 2008/0313528 A1 | 12/2008 | Chang | |
| 2009/0077092 A1 * | 3/2009 | Knight | G06Q 30/08 |
| 2010/0257089 A1 | 10/2010 | Johnson | |
| 2010/0325716 A1 | 12/2010 | Hong | |
| 2011/0184727 A1 | 7/2011 | Connor | |
| 2011/0246438 A1 | 10/2011 | Sathish | |
| 2011/0295895 A1 * | 12/2011 | Musgrove | G06Q 30/0603 707/777 |
| 2011/0307499 A1 | 12/2011 | Elias | |
| 2012/0101803 A1 | 4/2012 | Popov | |
| 2012/0101804 A1 | 4/2012 | Roth | |
| 2012/0226683 A1 | 9/2012 | Pogodin | |
| 2012/0251016 A1 | 10/2012 | Lyons | |
| 2012/0296835 A1 | 11/2012 | Khan K | |
| 2013/0282599 A1 | 10/2013 | Kang | |
| 2014/0108273 A1 | 4/2014 | Lundberg | |
| 2014/0180934 A1 | 6/2014 | Surdeanu | |
| 2014/0249801 A1 | 9/2014 | Jackson | |
| 2015/0106079 A1 * | 4/2015 | Bostick | G06F 16/3334 704/9 |
| 2015/0261745 A1 | 9/2015 | Song | |
| 2015/0278810 A1 | 10/2015 | Ramatchandirane | |
| 2015/0310000 A1 | 10/2015 | Schijvenaars | |
| 2016/0048936 A1 | 2/2016 | Perkowski | |
| 2016/0232246 A1 | 8/2016 | Rau | |
| 2016/0350886 A1 | 12/2016 | Jessen | |
| 2017/0039174 A1 | 2/2017 | Strope | |
| 2017/0124612 A1 * | 5/2017 | Musgrove | G06F 7/08 |
| 2017/0185591 A1 | 6/2017 | Tetreault | |
| 2017/0185921 A1 | 6/2017 | Zhang | |
| 2017/0220544 A1 | 8/2017 | Masson | |
| 2017/0256010 A1 * | 9/2017 | Mohindru | G06Q 50/184 |
| 2018/0018564 A1 | 1/2018 | Erenrich | |
| 2018/0108014 A1 | 4/2018 | Williams | |
| 2018/0113934 A1 | 4/2018 | Jablonski | |
| 2018/0121419 A1 | 5/2018 | Lee | |
| 2018/0144042 A1 | 5/2018 | Sheng | |
| 2018/0232361 A1 | 8/2018 | Schick | |
| 2018/0308003 A1 | 10/2018 | Singh | |
| 2018/0329883 A1 | 11/2018 | Leidner | |
| 2018/0357800 A1 | 12/2018 | Oxholm | |
| 2019/0005707 A1 | 1/2019 | Yamada | |
| 2019/0034416 A1 | 1/2019 | Al Hasan | |
| 2019/0332674 A1 | 10/2019 | Schick | |
| 2019/0377780 A1 | 12/2019 | Carey | |
| 2020/0184585 A1 | 6/2020 | Shirasaka | |
| 2020/0210442 A1 | 7/2020 | Bergeron | |
| 2020/0210603 A1 | 7/2020 | Schick | |
| 2020/0234000 A1 | 7/2020 | Schick | |
| 2020/0272692 A1 | 8/2020 | Maan | |
| 2022/0075962 A1 | 3/2022 | Kovarík | |

OTHER PUBLICATIONS

Bouayad-Agha, N., Casamayor, G., Ferraro, G., Mille, S., Vidal, V., & Wanner, L. (Jun. 2009). Improving the comprehension of legal documentation: the case of patent claims. In Proceedings of the 12th International Conference on Artificial Intelligence and Law (pp. 78-87). (Year: 2009).

Jhamtani, H., Gangal, V., Hovy, E., & Nyberg, E. (2017). Shakespearizing modern language using copy-enriched sequence-to-sequence models. arXiv preprint arXiv:1707.01161) (Year: 2017) 10 pages.

S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019 (Year: 2019).

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun.

(56) References Cited

OTHER PUBLICATIONS 8, 2009), pp. 78-87, XP058361680, DOI: 10.1145/1568234. 1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/ 1119303.1119311, abstract, Sections 1-4.

Tseng, Y. H., Lin, C. J., & Lin, Y. I. (2007). Text mining techniques for patent analysis. Information Processing & Management, 43(5), 1216-1247.

* cited by examiner

SYSTEMS AND METHODS FOR USING MACHINE LEARNING AND RULES-BASED ALGORITHMS TO CREATE A PATENT SPECIFICATION BASED ON HUMAN-PROVIDED PATENT CLAIMS SUCH THAT THE PATENT SPECIFICATION IS CREATED WITHOUT HUMAN INTERVENTION

FIELD OF THE DISCLOSURE

The present disclosure relates to systems and methods for providing a data structure representing patent claims, modifying data structures representing patent claims such that the modified data structures include language elements in prose rather than patentese, providing a data structure with ordered content derived from patent claims, identifying and naming software components described by functional patent claim language, and using machine learning and rules-based algorithms to create a patent specification based on human-provided patent claims such that the patent specification is created without human intervention.

BACKGROUND

Patent applications are documents prepared by licensed patent practitioners. These professionals are either patent attorneys (scientists/engineers with a law degree) or patent agents (scientists/engineers without a law degree). Once prepared, a patent application is filed with the United States Patent & Trademark Office (USPTO) where it is examined by a Patent Examiner. Each application is ultimately rejected or allowed to issue as a U.S. Patent.

A patent application has three main parts: claims, specification, and figures. The claims are a numbered list of sentences that precisely define what is being asserted as the invention. In other words, the claims attempt to define the boundary between what is regarded as prior art and what is considered as inventive (i.e., useful, new, and non-obvious). The specification is the longest section. It explains how to make and use the claimed invention. Finally, the figures complement the specification and depict the claimed features.

The profitability of patent preparation for law firms has been in decline due to a number of factors. More than ever, it is market forces rather than practitioner experience and competence that tend to drive fee amounts for preparing patent applications. The collision of these market-rate fee amounts with escalating hourly rates for practitioners creates a climate where often only entry-level and non-attorney practitioners can yield profitability. In some major general practice law firms, patent preparation is even viewed as a loss-leader practice to gain a position for licensing and litigation work. Complicating things further, a talent shortage is emerging with client demand for patent drafting ever increasing while the number of new patent practitioners minted each year trending downward.

SUMMARY

Exemplary implementations augment law firm leverage with cutting-edge machine learning and natural language generation technologies. Some implementations facilitate automated generation of complete patent application drafts based on concise practitioner inputs such as claim sets and/or drawing figures. Practitioners can now maximize their time and expertise by focusing on the client experience and only key aspects of the patent preparation process. Exemplary implementations handle the rest with near-instantaneous turnaround. For example, except for the background section and this paragraph, the present disclosure was automatically generated without human intervention based only on a single method claim set prepared by a patent practitioner.

One aspect of the present disclosure relates to a system configured for providing a data structure representing patent claims. The system may include one or more hardware processors configured by machine-readable instructions. The processor(s) may be configured to obtain a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. The processor(s) may be configured to process a claim line of the claim set. The claim line may be a unit of text having an end indicated by a presence of one or more end-of-claim line characters. The processor(s) may be configured to identify one or more features in the claim line to be stored in the data structure. The one or more features may include one or both of a main feature or a sub feature. The processor(s) may be configured to store the one or more features in the data structure. The main feature may include a step of a claimed process, a physical part of a claimed machine or article of manufacture, or a component of a claimed composition of matter. The sub feature may describe or expands on an aspect of a main feature.

Another aspect of the present disclosure relates to a method for providing a data structure representing patent claims. The method may include obtaining a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. The method may include processing a claim line of the claim set. The claim line may be a unit of text having an end indicated by a presence of one or more end-of-claim line characters. The method may include identifying one or more features in the claim line to be stored in the data structure. The one or more features may include one or both of a main feature or a sub feature. The method may include storing the one or more features in the data structure. The main feature may include a step of a claimed process, a physical part of a claimed machine or article of manufacture, or a component of a claimed composition of matter. The sub feature may describe or expands on an aspect of a main feature.

Yet another aspect of the present disclosure relates to a system configured for modifying data structures representing patent claims such that the modified data structures include language elements in prose rather than patentese. The system may include one or more hardware processors configured by machine-readable instructions. The processor(s) may be configured to obtain a data structure representing a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. The processor(s) may be configured to perform a natural language generation operation on the data structure to provide a modified data structure. The data structure may include a specialized format for organizing and storing data, the data structure including one or more of an array, a list, two or more linked lists, a stack, a queue, a graph, a table, or a tree. The data structure may include language units from the claim set. The language units may be in patentese. The language units may be organized in the data structure according to one or more classifications of individual language elements. The modified data structure may have the same dimensions as the data structure representing the claim set such that a given data structure element at a given position within the data structure representing the claim set corresponds to a given data structure element at the same position within the modified data structure.

Still another aspect of the present disclosure relates to a method for modifying data structures representing patent claims such that the modified data structures include language elements in prose rather than patentese. The method may include obtaining a data structure representing a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. The method may include performing a natural language generation operation on the data structure to provide a modified data structure. The data structure may include a specialized format for organizing and storing data, the data structure including one or more of an array, a list, two or more linked lists, a stack, a queue, a graph, a table, or a tree. The data structure may include language units from the claim set. The language units may be in patentese. The language units may be organized in the data structure according to one or more classifications of individual language elements. The modified data structure may have the same dimensions as the data structure representing the claim set such that a given data structure element at a given position within the data structure representing the claim set corresponds to a given data structure element at the same position within the modified data structure.

Even another aspect of the present disclosure relates to a system configured for providing a data structure with ordered content derived from patent claims. The system may include one or more hardware processors configured by machine-readable instructions. The processor(s) may be configured to obtain a first data structure representing a claim set. The first data structure may include language units from the claim set. The language units may be in patentese. The language units may be organized in the first data structure according to one or more classifications of individual language elements. The processor(s) may be configured to obtain a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. The processor(s) may be configured to identify main features in the first data structure. The main feature may include a step of a claimed process, a physical part of a claimed machine or article of manufacture, or a component of a claimed composition of matter. Identify sub features in the second data structure that correspond to individual ones of the main features in the first data structure. A given sub feature may describe or expands on an aspect of a corresponding main feature. The processor(s) may be configured to store the identified sub features from the second data structure in a third data structure such that a given identified sub feature is associated in the third data structure with a corresponding main feature. The processor(s) may be configured to, based on identified initial mentions and identified subsequent mentions, store, in the third data structure and in association with a corresponding main feature, the sub features from the second data structure that do not correspond to individual ones of the main features in the first data structure.

A further aspect of the present disclosure relates to a method for providing a data structure with ordered content derived from patent claims. The method may include obtaining a first data structure representing a claim set. The first data structure may include language units from the claim set. The language units may be in patentese. The language units may be organized in the first data structure according to one or more classifications of individual language elements. The method may include obtaining a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. The method may include identifying main features in the first data structure. The main feature may include a step of a claimed process, a physical part of a claimed machine or article of manufacture, or a component of a claimed composition of matter. Identify sub features in the second data structure that correspond to individual ones of the main features in the first data structure. A given sub feature may describe or expands on an aspect of a corresponding main feature. The method may include storing the identified sub features from the second data structure in a third data structure such that a given identified sub feature is associated in the third data structure with a corresponding main feature. The method may include, based on identified initial mentions and identified subsequent mentions, storing, in the third data structure and in association with a corresponding main feature, the sub features from the second data structure that do not correspond to individual ones of the main features in the first data structure.

A yet further of the present disclosure relates to a system configured for identifying and naming software components described by functional patent claim language. The system may include one or more hardware processors configured by machine-readable instructions. The processor(s) may be configured to obtain a data structure representing a claim set. The data structure may include language units from the claim set. The language units may be in patentese. The processor(s) may be configured to obtain a data structure element from the data structure. The data structure element may include a main feature. The main feature may include a step of a claimed process. The processor(s) may be configured to identify a main verb to be associated with a software component name that corresponds to the main feature. The main verb may describe a primary function of the main feature. The processor(s) may be configured to, in response to identify the main verb, identifying a noun or noun phrase to be associated with the software component name. The processor(s) may be configured to determine the software component name based on the identified main verb and the identified noun or noun phrase.

A still further aspect of the present disclosure relates to a method for identifying and naming software components described by functional patent claim language. The method may include obtaining a data structure representing a claim set. The data structure may include language units from the claim set. The language units may be in patentese. The method may include obtaining a data structure element from the data structure. The data structure element may include a main feature. The main feature may include a step of a claimed process. The method may include identifying a main verb to be associated with a software component name that corresponds to the main feature. The main verb may describe a primary function of the main feature. The method may include, in response to identifying the main verb, identifying a noun or noun phrase to be associated with the software component name. The method may include determining the software component name based on the identified main verb and the identified noun or noun phrase.

An even further aspect of the present disclosure relates to a system configured for using machine learning and rules-based algorithms to create a patent specification based on human-provided patent claims such that the patent specification is created without human intervention. The system may include one or more hardware processors configured by machine-readable instructions. The processor(s) may be configured to obtain a claim set. The claim set may include a numbered list of sentences that precisely define an invention. The claim set may include an independent claim and one or more dependent claims, each dependent claim in the claim set depending on the independent claim by referring to the independent claim or an intervening dependent claim. The claim set was prepared by a human. The processor(s) may be configured to obtain a first data structure representing the claim set. The first data structure may include language units from the claim set. The language units may be in patentese. The processor(s) may be configured to obtain a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. The processor(s) may be configured to obtain a third data structure. The third data structure may include ordered content derived from the claim set. The ordered content of the third data structure may be ordered based on one or more of claim structure of the claim set, antecedent basis in the claim set, or claim dependency in the claim set. The processor(s) may be configured to determine one or more sections of the patent specification based on the first data structure, the second data structure, and the third data structure.

And another aspect of the present disclosure relates to a method for using machine learning and rules-based algorithms to create a patent specification based on human-provided patent claims such that the patent specification is created without human intervention. The method may include obtaining a claim set. The claim set may include a numbered list of sentences that precisely define an invention. The claim set may include an independent claim and one or more dependent claims, each dependent claim in the claim set depending on the independent claim by referring to the independent claim or an intervening dependent claim. The claim set was prepared by a human. The method may include obtaining a first data structure representing the claim set. The first data structure may include language units from the claim set. The language units may be in patentese. The method may include obtaining a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. The method may include obtaining a third data structure. The third data structure may include ordered content derived from the claim set. The ordered content of the third data structure may be ordered based on one or more of claim structure of the claim set, antecedent basis in the claim set, or claim dependency in the claim set. The method may include determining one or more sections of the patent specification based on the first data structure, the second data structure, and the third data structure.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
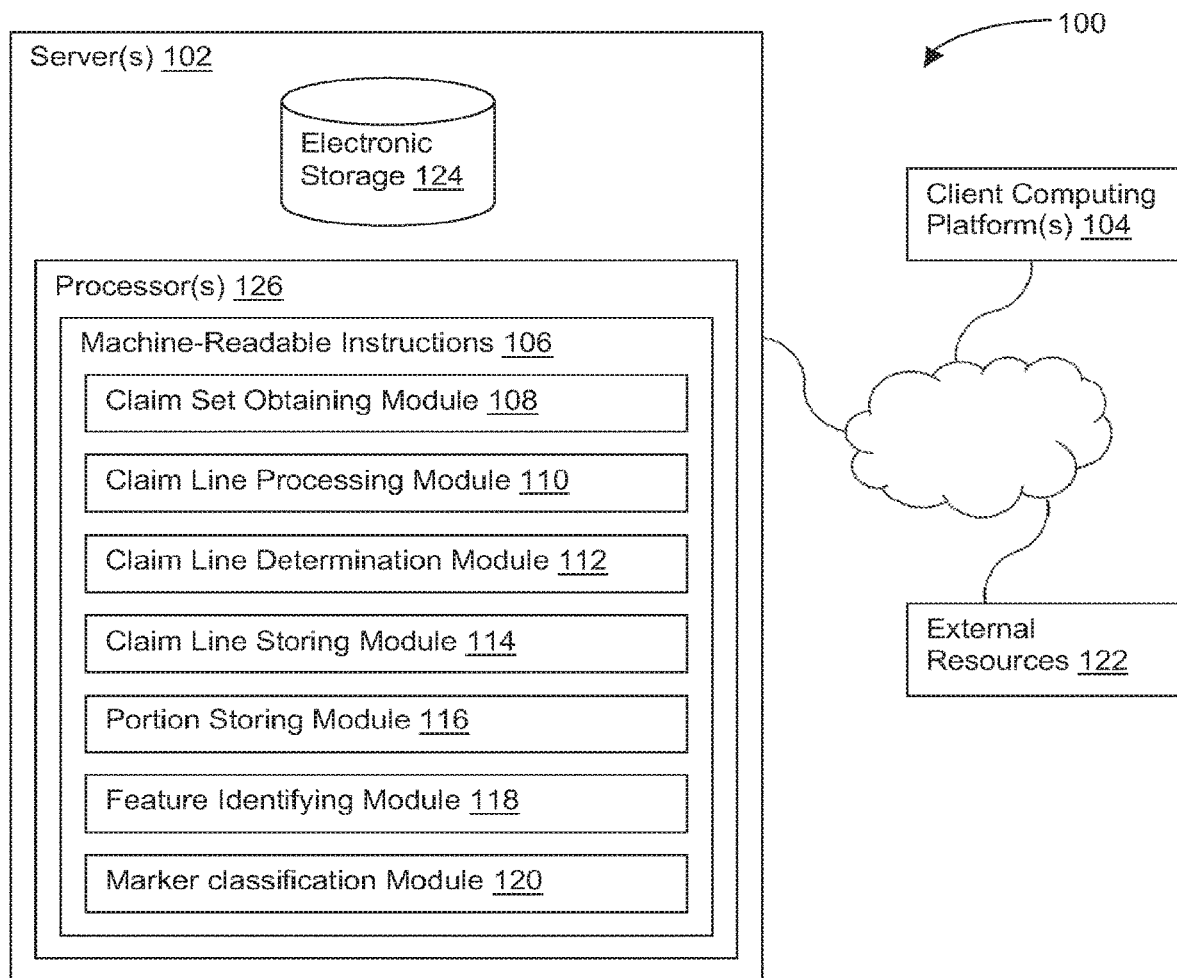
FIG. 1 illustrates a system configured for providing a data structure representing patent claims, in accordance with one or more implementations.

FIG. 1 illustrates a system 100 configured for providing a data structure representing patent claims, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a claim set obtaining module 108, a claim line processing module 110, a claim line determination module 112, a claim line storing module 114, a portion storing module 116, a feature identifying module 118, a marker classification module 120, and/or other instruction modules.

Claim set obtaining module 108 may be configured to obtain a claim set. The claim set may include a numbered list of sentences that precisely define an invention. The claim number indicated a position of a corresponding claim in the numbered list of sentences of the claim set. The claim set may include an independent claim and one or more dependent claims. Each dependent claim in the claim set may depend on the independent claim by referring to the independent claim or an intervening dependent claim.

Claim line processing module 110 may be configured to process a claim line of the claim set. Determining whether the claim line may belong to an independent claim or a dependent claim includes determining whether the claim line includes a reference to another claim. The reference may indicate that the claim line belongs to a dependent claim. The claim line may be a unit of text having an end indicated by a presence of one or more end-of-claim line characters. By way of non-limiting example, the one or more end-of-claim line characters may include one or more of a colon, a semi-colon, or a carriage return.

Claim line determination module 112 may be configured to determine whether the claim line is a first claim line of a claim. Determining whether the claim line may be the first claim line of a claim includes determining whether the claim line begins with a claim number.

Claim line determination module 112 may be configured to, responsive to a determination that the claim line is the first claim line of a claim, determine whether the claim line belongs to an independent claim or a dependent claim.

Claim line determination module 112 may be configured to determine whether there are more claim lines in the claim set to be iterated on.

Claim line storing module 114 may be configured to, responsive to a determination that the claim line belongs to an independent claim, store the claim line as an independent claim preamble in a data structure. The independent claim preamble may convey a general description of the invention as a whole. By way of non-limiting example, the data structure may include a specialized format for organizing and storing data, the data structure including one or more of an array, a list, two or more linked lists, a stack, a queue, a graph, a table, or a tree.

The data structure may include language units from the claim set. The language units may be in patentese. Patentese may include text structure and legal jargon commonly used in patent claims. The language units may be organized in the data structure according to one or more classifications of individual language elements. By way of non-limiting example, a language element may include one or more of a word, a phrase, a clause, or a sentence. A claim may be a single sentence. By way of non-limiting example, a sentence may include a set of words that is complete and contains a subject and predicate, a sentence including a main clause and optionally one or more subordinate clauses. By way of non-limiting example, a clause may include a unit of grammatical organization next below a sentence, a clause including a subject and predicate. A phrase may include a small group of words standing together as a conceptual unit, a phrase forming a component of a clause. By way of non-limiting example, a word may include a single distinct meaningful element of language used with others to form a sentence, a word being shown with a space on either side when written or printed. By way of non-limiting example, the one or more classifications may include one or more of independent claim, dependent claim, preamble, main feature, sub feature, claim line, clause, phrase, or word.

Portion storing module 116 may be configured to, responsive to a determination that the claim line belongs to a dependent claim, store a portion of the claim line as a dependent claim preamble in the data structure. The dependent claim preamble may include a reference to a preceding claim. Identify one or more clauses in the claim line. Identifying the one or more clauses in the claim line may include applying a machine learning model to the claim line. By way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm. Applying the machine learning model to the claim line may result in one or more aspects of a given clause being labeled. By way of non-limiting example, identifying the one or more clauses in the claim line may include determining whether the claim line includes one or more markers, a given marker being a trigger word, a trigger phrase, or a trigger punctuation.

Feature identifying module 118 may be configured to identify one or more features in the claim line to be stored in the data structure. The one or more features may include one or both of a main feature or a sub feature. By way of non-limiting example, the main feature may include a step of a claimed process, a physical part of a claimed machine or article of manufacture, or a component of a claimed composition of matter. The sub feature may describe or expands on an aspect of a main feature.

Marker classification module 120 may be configured to, responsive to a determination that the claim line includes one or more markers, classify individual ones of the one or more markers. In some implementations, by way of non-limiting example, classifying the given marker may include determining whether the given marker exists within a clause, whether the given marker indicates a boundary between two clauses, or whether the given marker indicates a clause containing a list.

In some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute modules 108, 110, 112, 114, 116, 118, 120, and/or other modules. Processor(s) 126 may be configured to execute modules 108, 110, 112, 114, 116, 118, 120, and/or other modules by software; hardware; firmware; some combination of software, hardware, and/or firmware; and/or other mechanisms for configuring processing capabilities on processor(s) 126. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, and 120 are illustrated in FIG. 1 as being implemented within a single processing unit, in implementations in which processor(s) 126 includes multiple processing units, one or more of modules 108, 110, 112, 114, 116, 118, and/or 120 may be implemented remotely from the other modules. The description of the functionality provided by the different modules 108, 110, 112, 114, 116, 118, and/or 120 described below is for illustrative purposes, and is not intended to be limiting, as any of modules 108, 110, 112, 114, 116, 118, and/or 120 may provide more or less functionality than is described. For example, one or more of modules 108, 110, 112, 114, 116, 118, and/or 120 may be eliminated, and some or all of its functionality may be provided by other ones of modules 108, 110, 112, 114, 116, 118, and/or 120. As another example, processor(s) 126 may be configured to execute one or more additional modules that may perform some or all of the functionality attributed below to one of modules 108, 110, 112, 114, 116, 118, and/or 120.

Figure 2:
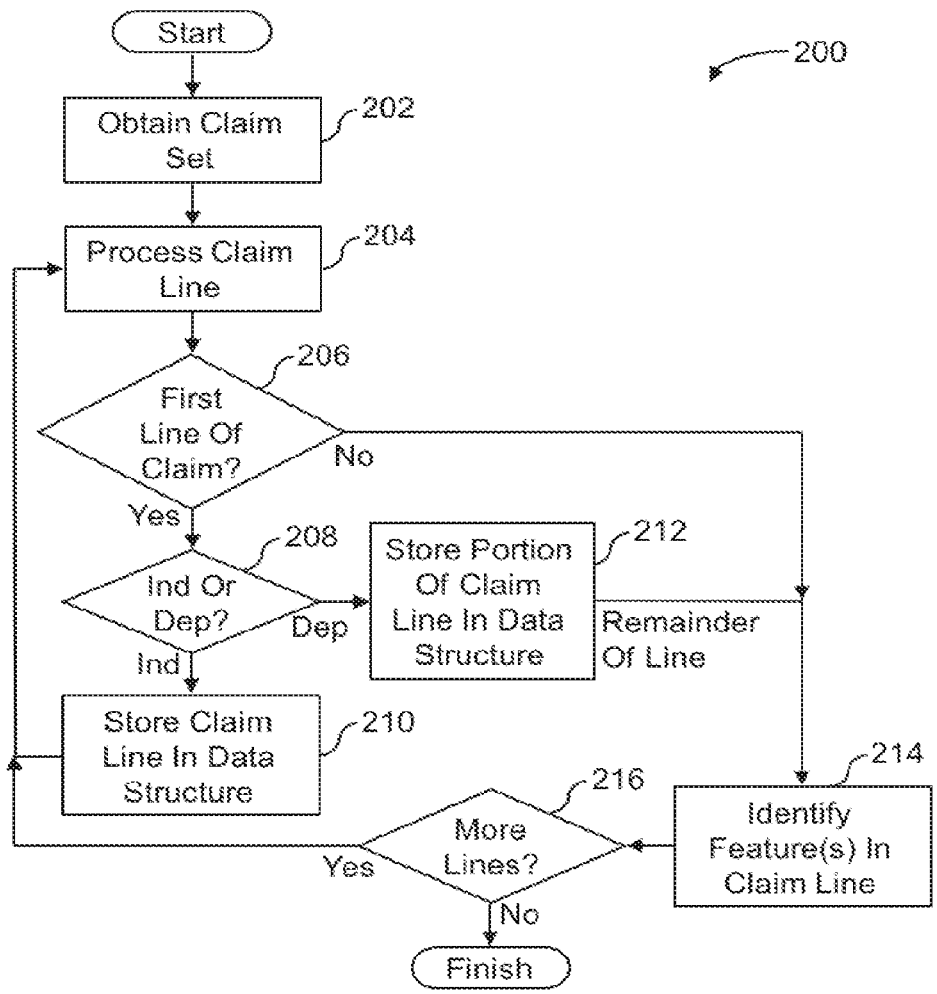
FIG. 2 illustrates a method for providing a data structure representing patent claims, in accordance with one or more implementations.

FIG. 2 illustrates a method 200 for providing a data structure representing patent claims, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. Operation 202 may be performed by one or more hardware processors configured by machine-readable instructions including a module that is the same as or similar to claim set obtaining module 108, in accordance with one or more implementations.

An operation 204 may include processing a claim line of the claim set. The claim line may be a unit of text having an end indicated by a presence of one or more end-of-claim line characters. Operation 204 may be performed by one or more hardware processors configured by machine-readable instructions including a module that is the same as or similar to claim line processing module 110, in accordance with one or more implementations.

An operation 206 may include determining whether the claim line is a first claim line of a claim. Operation 206 may be performed by one or more hardware processors configured by machine-readable instructions including a module that is the same as or similar to claim line determination module 112, in accordance with one or more implementations.

An operation 208 may include, responsive to a determination that the claim line is the first claim line of a claim, determining whether the claim line belongs to an independent claim or a dependent claim. Operation 208 may be performed by one or more hardware processors configured by machine-readable instructions including a module that is the same as or similar to claim line determination module 112, in accordance with one or more implementations.

An operation 210 may include, responsive to a determination that the claim line belongs to an independent claim, storing the claim line as an independent claim preamble in a data structure. Operation 210 may be performed by one or more hardware processors configured by machine-readable instructions including a module that is the same as or similar to claim line storing module 114, in accordance with one or more implementations.

An operation 212 may include, responsive to a determination that the claim line belongs to a dependent claim, storing a portion of the claim line as a dependent claim preamble in the data structure. Identify one or more clauses in the claim line. Operation 212 may be performed by one or more hardware processors configured by machine-readable instructions including a module that is the same as or similar to portion storing module 116, in accordance with one or more implementations.

An operation 214 may include identifying one or more features in the claim line to be stored in the data structure. The one or more features may include one or both of a main feature or a sub feature. Operation 214 may be performed by one or more hardware processors configured by machine-readable instructions including a module that is the same as or similar to feature identifying module 118, in accordance with one or more implementations.

An operation 216 may include determining whether there are more claim lines in the claim set to be iterated on.

Operation 216 may be performed by one or more hardware processors configured by machine-readable instructions including a module that is the same as or similar to claim line determination module 112, in accordance with one or more implementations.

Figure 3:
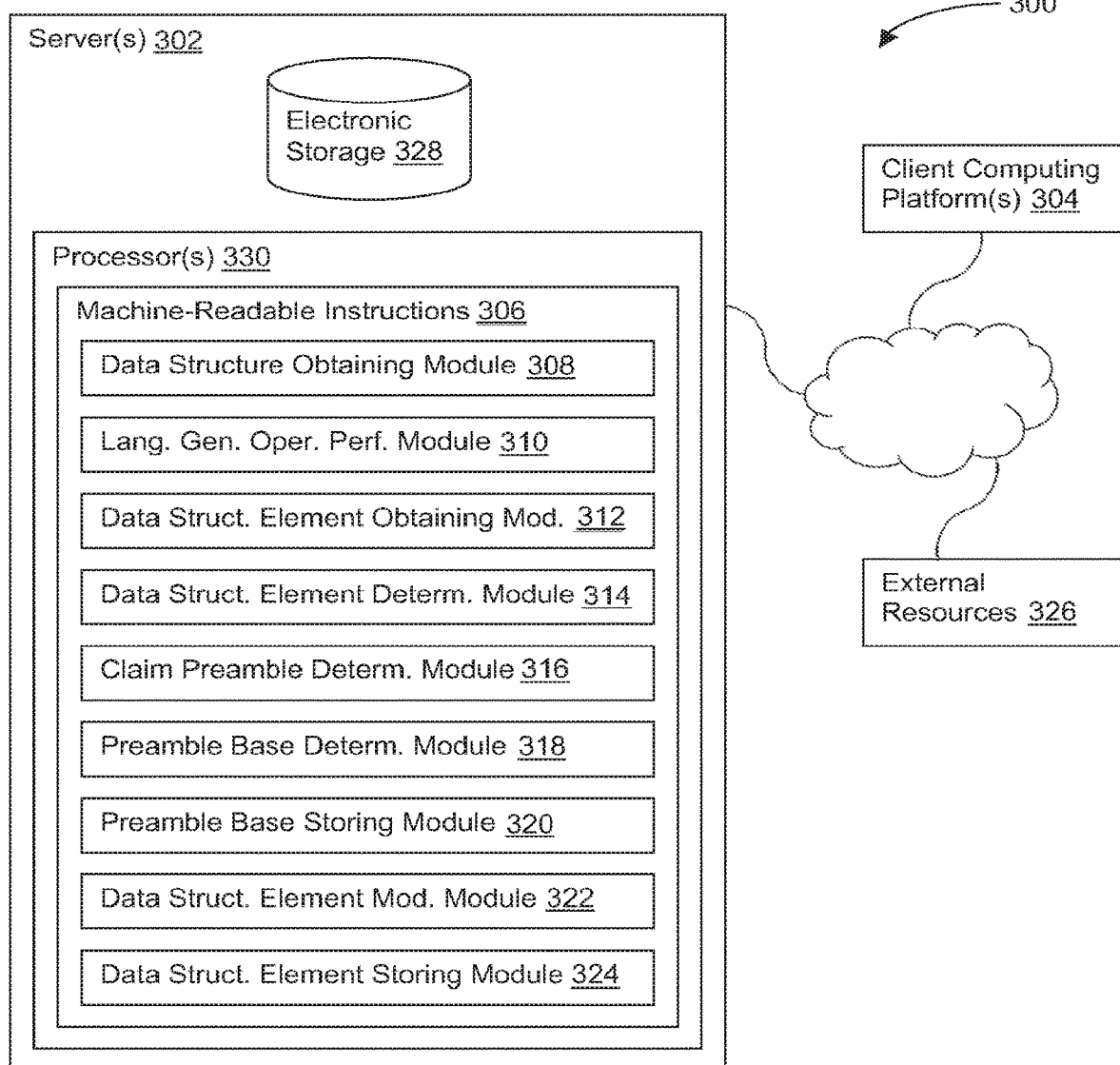
FIG. 3 illustrates a system configured for modifying data structures representing patent claims such that the modified data structures include language elements in prose rather than patentese, in accordance with one or more implementations.

FIG. 3 illustrates a system 300 configured for modifying data structures representing patent claims such that the modified data structures include language elements in prose rather than patentese, in accordance with one or more implementations. In some implementations, system 300 may include one or more servers 302. Server(s) 302 may be configured to communicate with one or more client computing platforms 304 according to a client/server architecture and/or other architectures. Client computing platform(s) 304 may be configured to communicate with other client computing platforms via server(s) 302 and/or according to a peer-to-peer architecture and/or other architectures. Users may access system 300 via client computing platform(s) 304.

Server(s) 302 may be configured by machine-readable instructions 306. Machine-readable instructions 306 may include one or more instruction modules. The instruction modules may include computer program modules. The instruction modules may include one or more of a data structure obtaining module 308, a language generation operation performance module 310, a data structure element obtaining module 312, a data structure element determination module 314, a claim preamble determination module 316, a preamble base determination module 318, a preamble base storing module 320, a data structure element modification module 322, a data structure element storing module 324, and/or other instruction modules.

Data structure obtaining module 308 may be configured to obtain a data structure representing a claim set. By way of non-limiting example, the data structure may include a specialized format for organizing and storing data, the data structure including one or more of an array, a list, two or more linked lists, a stack, a queue, a graph, a table, or a tree. The claim set may include a numbered list of sentences that precisely define an invention. The claim set may include an independent claim and one or more dependent claims. Each dependent claim in the claim set may depend on the independent claim by referring to the independent claim or an intervening dependent claim.

The data structure may include language units from the claim set. The language units may be in patentese. Patentese may include text structure and legal jargon commonly used in patent claims. The language units may be organized in the data structure according to one or more classifications of individual language elements. By way of non-limiting example, a language element may include one or more of a word, a phrase, a clause, or a sentence. A claim may be a single sentence. By way of non-limiting example, a sentence may include a set of words that is complete and contains a subject and predicate, a sentence including a main clause and optionally one or more subordinate clauses. By way of non-limiting example, a clause may include a unit of grammatical organization next below a sentence, a clause including a subject and predicate. A phrase may include a small group of words standing together as a conceptual unit, a phrase forming a component of a clause. By way of non-limiting example, a word may include a single distinct meaningful element of language used with others to form a sentence, a word being shown with a space on either side when written or printed.

By way of non-limiting example, the one or more classifications may include one or more of independent claim, dependent claim, preamble, main feature, sub feature, claim line, clause, phrase, or word. A preamble of an independent claim preamble may convey a general description of the invention as a whole. A preamble of a dependent claim may include a reference to a preceding claim. By way of non-limiting example, a main feature may include a step of a claimed process, a physical part of a claimed machine or article of manufacture, or a component of a claimed composition of matter. A sub feature may describe or expands on an aspect of a main feature.

A claim line may be a unit of text having an end indicated by a presence of one or more end-of-claim line characters. By way of non-limiting example, the one or more end-of-claim line characters may include one or more of a colon, a semi-colon, or a carriage return.

Language generation operation performance module 310 may be configured to perform a natural language generation operation on the data structure. The natural language generation operation may be based on a machine learning model. By way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

By way of non-limiting example, the natural language generation operation may include one or more of paraphrase induction, simplification, compression, clause fusion, or expansion. Paraphrase induction may include preserving original meaning. By way of non-limiting example, paraphrase induction may include rewording and/or rearranging one or more of phrases, clauses, claim lines, or entire claims. Simplification may include preserving original meaning. Simplification may include splitting up a claim line for readability. Compression may include preserving important aspects. Compression may include deleting content for summarization. Fusion may include preserving important aspects. Fusion combining language elements for summarization. Expansion may include preserving original meaning and embellishing on the original content. Expansion may include introducing new content that supports or broadens the original meaning. Sentence semantics may be lossless with paraphrasing and simplification. Sentence semantics may be lossy with compression and fusion.

A one-to-one language element transformation may occur with paraphrasing and compression. A one-to-many language element transformation may occur with simplification. A many-to-one language element transformation may occur with fusion. The natural language generation operation may be performed according to a set of rules.

Data structure element obtaining module 312 may be configured to obtain a data structure element.

Data structure element determination module 314 may be configured to determine whether the data structure element includes a claim preamble.

Data structure element determination module 314 may be configured to, responsive to a determination that the data structure element does not include a claim preamble, determine whether the data structure element includes a main feature.

Data structure element determination module 314 may be configured to, responsive to a determination that the data structure element does not include a main feature, determine whether the data structure element includes a list of list items.

Data structure element determination module 314 may be configured to determine whether there are more data structure elements to be iterated on.

Claim preamble determination module 316 may be configured to, responsive to a determination that the data structure element includes a claim preamble, determine whether the claim preamble is from an independent claim or a dependent claim.

Preamble base determination module 318 may be configured to, responsive to a determination that the claim preamble is from an independent claim, determine a preamble base from the claim preamble. The preamble base may include the claim preamble without leading generic terms or transition words. By way of non-limiting example, a leading generic term may include system, method, device, apparatus, or composition.

Preamble base storing module 320 may be configured to store the preamble base in a modified data structure. The modified data structure may have the same dimensions as the data structure representing the claim set such that a given data structure element at a given position within the data structure representing the claim set corresponds to a given data structure element at the same position within the modified data structure.

Data structure element modification module 322 may be configured to, responsive to a determination that the data structure element does include a main feature, modify the data structure element by converting a verb, a gerund, or a present participle to a corresponding lemma. In some implementations, by way of non-limiting example, a lemma may include a canonical form, a dictionary form, or a citation form of a set of words.

Data structure element modification module 322 may be configured to, responsive to a determination that the data structure element includes a list of list items, modify the data structure element by converting the data structure element to a permissive list format. The permissive list format may convey an unrestricted list of allowed list items but not obligatory list items.

Data structure element modification module 322 may be configured to, responsive to a determination that the data structure element does not include a list of list items, modify the data structure element by converting the data structure element to prose. The prose may include an ordinary form of written language, without structure of claim language, as distinguished from patentese. The prose may include permissive prose. In some implementations, the permissive prose conveying allowed but not obligatory concepts.

Data structure element storing module 324 may be configured to store the modified data structure element in the modified data structure.

In some implementations, server(s) 302, client computing platform(s) 304, and/or external resources 326 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platform(s) 304, and/or external resources 326 may be operatively linked via some other communication media.

A given client computing platform 304 may include one or more processors configured to execute computer program modules. The computer program modules may be configured to enable an expert or user associated with the given client computing platform 304 to interface with system 300 and/or external resources 326, and/or provide other functionality attributed herein to client computing platform(s) 304. By way of non-limiting example, the given client computing platform 304 may include one or more of a desktop computer, a laptop computer, a handheld computer, a tablet computing platform, a NetBook, a Smartphone, a gaming console, and/or other computing platforms.

External resources 326 may include sources of information outside of system 300, external entities participating with system 300, and/or other resources. In some implementations, some or all of the functionality attributed herein to external resources 326 may be provided by resources included in system 300.

Server(s) 302 may include electronic storage 328, one or more processors 330, and/or other components. Server(s) 302 may include communication lines, or ports to enable the exchange of information with a network and/or other computing platforms. Illustration of server(s) 302 in FIG. 3 is not intended to be limiting. Server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 328 may comprise non-transitory storage media that electronically stores information. The electronic storage media of electronic storage 328 may include one or both of system storage that is provided integrally (i.e., substantially non-removable) with server(s) 302 and/or removable storage that is removably connectable to server(s) 302 via, for example, a port (e.g., a USB port, a firewire port, etc.) or a drive (e.g., a disk drive, etc.). Electronic storage 328 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 328 may include one or more virtual storage resources (e.g., cloud storage, a virtual private network, and/or other virtual storage resources). Electronic storage 328 may store software algorithms, information determined by processor(s) 330, information received from server(s) 302, information received from client computing platform(s) 304, and/or other information that enables server(s) 302 to function as described herein.

Processor(s) 330 may be configured to provide information processing capabilities in server(s) 302. As such, processor(s) 330 may include one or more of a digital processor, an analog processor, a digital circuit designed to process information, an analog circuit designed to process information, a state machine, and/or other mechanisms for electronically processing information. Although processor(s) 330 is shown in FIG. 3 as a single entity, this is for illustrative purposes only. In some implementations, processor(s) 330 may include a plurality of processing units. These processing units may be physically located within the same device, or processor(s) 330 may represent processing functionality of a plurality of devices operating in coordination. Processor(s) 330 may be configured to execute modules 308, 310, 312, 314, 316, 318, 320, 322, 324, and/or other modules. Processor(s) 330 may be configured to execute modules 308, 310, 312, 314, 316, 318, 320, 322, 324, and/or other modules by software; hardware; firmware; some combination of software, hardware, and/or firmware; and/or other mechanisms for configuring processing capabilities on processor(s) 330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, and 324 are illustrated in FIG. 3 as being implemented within a single processing unit, in implementations in which processor(s) 330 includes multiple processing units, one or more of modules 308, 310, 312, 314, 316, 318, 320, 322, and/or 324 may be implemented remotely from the other modules. The description of the functionality provided by the different modules 308, 310, 312, 314, 316, 318, 320, 322, and/or 324 described below is for illustrative purposes, and is not intended to be limiting, as any of modules 308, 310, 312, 314, 316, 318, 320, 322, and/or 324 may provide more or less functionality than is described. For example, one or more of modules 308, 310, 312, 314, 316, 318, 320, 322, and/or 324 may be eliminated, and some or all of its functionality may be provided by other ones of modules 308, 310, 312, 314, 316, 318, 320, 322, and/or 324. As another example, processor(s) 330 may be configured to execute one or more additional modules that may perform some or all of the functionality attributed below to one of modules 308, 310, 312, 314, 316, 318, 320, 322, and/or 324.

Figure 4:
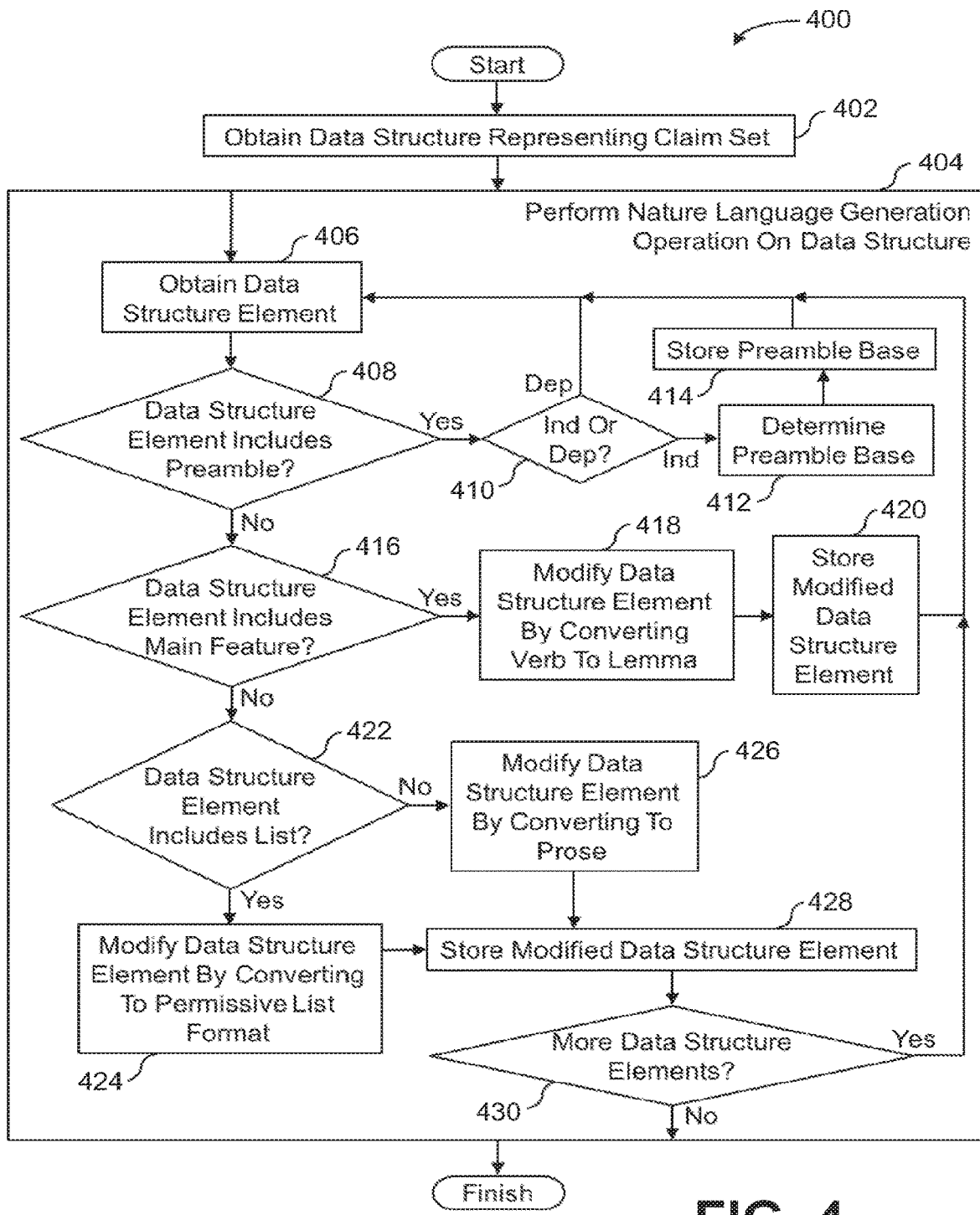
FIG. 4 illustrates a method for modifying data structures representing patent claims such that the modified data structures include language elements in prose rather than patentese, in accordance with one or more implementations.

FIG. 4 illustrates a method 400 for modifying data structures representing patent claims such that the modified data structures include language elements in prose rather than patentese, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining a data structure representing a claim set. The claim set may include a numbered list of sentences that precisely define an invention. The claim set may include an independent claim and one or more dependent claims. Each dependent claim in the claim set may depend on the independent claim by referring to the independent claim or an intervening dependent claim. Operation 402 may be performed by one or more hardware processors configured by machine-readable instructions including a module that is the same as or similar to data structure obtaining module 308, in accordance with one or more implementations.

An operation 404 may include performing a natural language generation operation on the data structure. Operation 404 may be performed by one or more hardware processors configured by machine-readable instructions including a module that is the same as or similar to language generation operation performance module 310, in accordance with one or more implementations.

An operation 406 may include obtaining a data structure element. Operation 406 may be performed by one or more hardware processors configured by machine-readable instructions including a module that is the same as or similar to data structure element obtaining module 312, in accordance with one or more implementations.

An operation 408 may include determining whether the data structure element includes a claim preamble. Operation 408 may be performed by one or more hardware processors configured by machine-readable instructions including a module that is the same as or similar to data structure element determination module 314, in accordance with one or more implementations.

An operation 410 may include, responsive to a determination that the data structure element includes a claim preamble, determining whether the claim preamble is from an independent claim or a dependent claim. Operation 410 may be performed by one or more hardware processors configured by machine-readable instructions including a module that is the same as or similar to claim preamble determination module 316, in accordance with one or more implementations.

An operation 412 may include, responsive to a determination that the claim preamble is from an independent claim, determining a preamble base from the claim preamble. Operation 412 may be performed by one or more hardware processors configured by machine-readable instructions including a module that is the same as or similar to preamble base determination module 318, in accordance with one or more implementations.

An operation 414 may include storing the preamble base in a modified data structure. Operation 414 may be performed by one or more hardware processors configured by machine-readable instructions including a module that is the same as or similar to preamble base storing module 320, in accordance with one or more implementations.

An operation 416 may include, responsive to a determination that the data structure element does not include a claim preamble, determining whether the data structure element includes a main feature. Operation 416 may be performed by one or more hardware processors configured by machine-readable instructions including a module that is the same as or similar to data structure element determination module 314, in accordance with one or more implementations.

An operation 418 may include, responsive to a determination that the data structure element does include a main feature, modifying the data structure element by converting a verb, a gerund, or a present participle to a corresponding lemma. Operation 418 may be performed by one or more hardware processors configured by machine-readable instructions including a module that is the same as or similar to data structure element modification module 322, in accordance with one or more implementations.

An operation 420 may include storing the modified data structure element in the modified data structure. Operation 420 may be performed by one or more hardware processors configured by machine-readable instructions including a module that is the same as or similar to data structure element storing module 324, in accordance with one or more implementations.

An operation 422 may include, responsive to a determination that the data structure element does not include a main feature, determining whether the data structure element includes a list of list items. Operation 422 may be performed by one or more hardware processors configured by machine-readable instructions including a module that is the same as or similar to data structure element determination module 314, in accordance with one or more implementations.

An operation 424 may include, responsive to a determination that the data structure element includes a list of list items, modifying the data structure element by converting the data structure element to a permissive list format. Operation 424 may be performed by one or more hardware processors configured by machine-readable instructions including a module that is the same as or similar to data structure element modification module 322, in accordance with one or more implementations.

An operation 426 may include, responsive to a determination that the data structure element does not include a list of list items, modifying the data structure element by converting the data structure element to prose. Operation 426 may be performed by one or more hardware processors configured by machine-readable instructions including a module that is the same as or similar to data structure element modification module 322, in accordance with one or more implementations.

An operation 428 may include storing the modified data structure element in the modified data structure. Operation 428 may be performed by one or more hardware processors configured by machine-readable instructions including a module that is the same as or similar to data structure element storing module 324, in accordance with one or more implementations.

An operation 430 may include determining whether there are more data structure elements to be iterated on. Operation 430 may be performed by one or more hardware processors configured by machine-readable instructions including a module that is the same as or similar to data structure element determination module 314, in accordance with one or more implementations.

Figure 5:
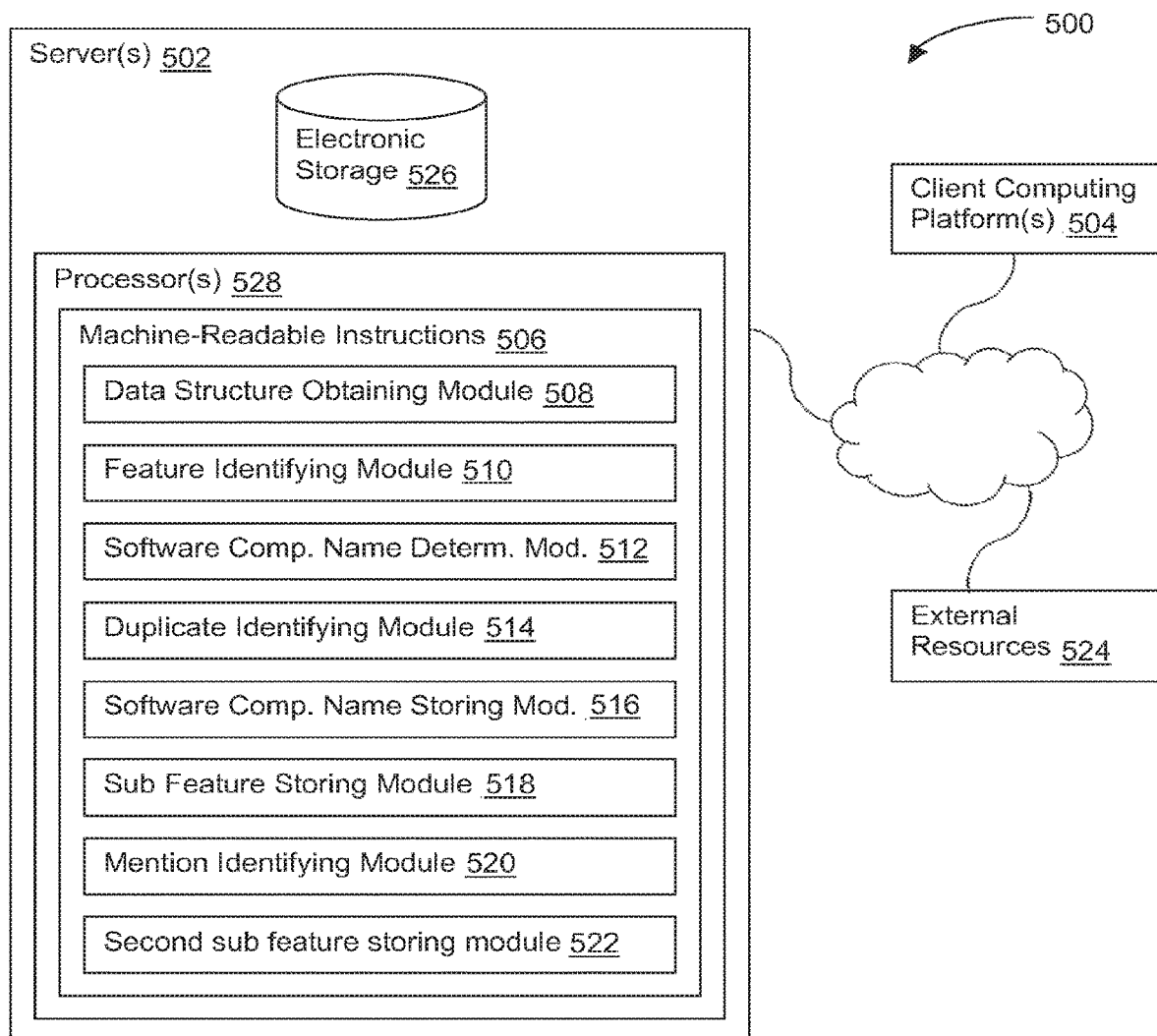
FIG. 5 illustrates a system configured for providing a data structure with ordered content derived from patent claims, in accordance with one or more implementations.

FIG. 5 illustrates a system 500 configured for providing a data structure with ordered content derived from patent claims, in accordance with one or more implementations. In some implementations, system 500 may include one or more servers 502. Server(s) 502 may be configured to communicate with one or more client computing platforms 504 according to a client/server architecture and/or other architectures. Client computing platform(s) 504 may be configured to communicate with other client computing platforms via server(s) 502 and/or according to a peer-to-peer architecture and/or other architectures. Users may access system 500 via client computing platform(s) 504.

Server(s) 502 may be configured by machine-readable instructions 506. Machine-readable instructions 506 may include one or more instruction modules. The instruction modules may include computer program modules. The instruction modules may include one or more of a data structure obtaining module 508, a feature identifying module 510, a software component name determination module 512, a duplicate identifying module 514, a software component name storing module 516, a sub feature storing module 518, a mention identifying module 520, a second sub feature storing module 522, and/or other instruction modules.

Data structure obtaining module 508 may be configured to obtain a first data structure representing a claim set. In some implementations, by way of non-limiting example, a given data structure may include a specialized format for organizing and storing data, the data structure including one or more of an array, a list, two or more linked lists, a stack, a queue, a graph, a table, or a tree.

The first data structure may include language units from the claim set. The language units may be organized in the first data structure according to one or more classifications of individual language elements. The language units may be in patentese. The patentese may include text structure and legal jargon commonly used in patent claims. By way of non-limiting example, a language element may include one or more of a word, a phrase, a clause, or a sentence. By way of non-limiting example, the one or more classifications may include one or more of independent claim, dependent claim, preamble, main feature, sub feature, claim line, clause, phrase, or word.

A claim may be a single sentence. By way of non-limiting example, a sentence may include a set of words that is complete and contains a subject and predicate, a sentence including a main clause and optionally one or more subordinate clauses. By way of non-limiting example, a clause may include a unit of grammatical organization next below a sentence, a clause including a subject and predicate. A phrase may include a small group of words standing together as a conceptual unit, a phrase forming a component of a clause. By way of non-limiting example, a word may include a single distinct meaningful element of language used with others to form a sentence, a word being shown with a space on either side when written or printed.

Data structure obtaining module 508 may be configured to obtain a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. The prose may include an ordinary form of written language, without structure of claim language, as distinguished from patentese. The prose may include permissive prose. In some implementations, the permissive prose may convey allowed but not obligatory concepts.

Feature identifying module 510 may be configured to identify main features in the first data structure. In some implementations, by way of non-limiting example, the main feature may include a step of a claimed process, a physical part of a claimed machine or article of manufacture, or a component of a claimed composition of matter. In some implementations, a given sub feature may describe or expands on an aspect of a corresponding main feature.

Software component name determination module 512 may be configured to determine software component names associated with individual ones of the main features. In some implementations, a given software component name may describe a functional aspect of a software program.

Duplicate identifying module 514 may be configured to identify duplicates among the software component names to obtain unique software component names.

Software component name storing module 516 may be configured to store the unique software component names in a third data structure along with corresponding main features such that a given main feature is associated in the third data structure with a given unique software component name.

Identify sub features in the second data structure that correspond to individual ones of the main features in the first data structure.

Sub feature storing module 518 may be configured to store the identified sub features from the second data structure in the third data structure such that a given identified sub feature is associated in the third data structure with a corresponding main feature.

Mention identifying module 520 may be configured to identify initial mentions of content words in the main features and sub features stored in the third data structure.

Mention identifying module 520 may be configured to identify subsequent mentions of content words in sub features in the second data structure that do not correspond to individual ones of the main features in the first data structure and that are not yet stored in the third data structure. The content words may be words that have meaning as opposed to grammatical or structural words. By way of non-limiting example, a given content word may be a noun, a main verb, an adjective or an adverb. By way of non-limiting example, a given grammatical or structural word may be an auxiliary verb, a pronoun, an article, or a preposition. An initial mention of a given content word may be the first time the given content word is mentioned in the third data structure. The initial mention of the given content word may be not preceded by a definite article. The subsequent mentions may be identified based on a presence of a definite article preceding individual ones of the subsequent mentions.

Second sub feature storing module 522 may be configured to, based on the identified initial mentions and the identified subsequent mentions, store, in the third data structure and in association with a corresponding main feature, the sub features from the second data structure that do not correspond to individual ones of the main features in the first data structure. If a given sub feature may correspond with more than one main feature based on the identified initial mentions and the identified subsequent mentions, the given sub features is stored in the third data structure is association with the corresponding main feature that fall last in the third data structure among all the corresponding main features.

In some implementations, one or more operations may include applying a machine learning model. In some implementations, by way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

In some implementations, server(s) 502, client computing platform(s) 504, and/or external resources 524 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 502, client computing platform(s) 504, and/or external resources 524 may be operatively linked via some other communication media.

A given client computing platform 504 may include one or more processors configured to execute computer program modules. The computer program modules may be configured to enable an expert or user associated with the given client computing platform 504 to interface with system 500 and/or external resources 524, and/or provide other functionality attributed herein to client computing platform(s) 504. By way of non-limiting example, the given client computing platform 504 may include one or more of a desktop computer, a laptop computer, a handheld computer, a tablet computing platform, a NetBook, a Smartphone, a gaming console, and/or other computing platforms.

External resources 524 may include sources of information outside of system 500, external entities participating with system 500, and/or other resources. In some implementations, some or all of the functionality attributed herein to external resources 524 may be provided by resources included in system 500.

Server(s) 502 may include electronic storage 526, one or more processors 528, and/or other components. Server(s) 502 may include communication lines, or ports to enable the exchange of information with a network and/or other computing platforms. Illustration of server(s) 502 in FIG. 5 is not intended to be limiting. Server(s) 502 may include a plurality of hardware, software, and/or firmware components operating together to provide the functionality attributed herein to server(s) 502. For example, server(s) 502 may be implemented by a cloud of computing platforms operating together as server(s) 502.

Electronic storage 526 may comprise non-transitory storage media that electronically stores information. The electronic storage media of electronic storage 526 may include one or both of system storage that is provided integrally (i.e., substantially non-removable) with server(s) 502 and/or removable storage that is removably connectable to server(s) 502 via, for example, a port (e.g., a USB port, a firewire port, etc.) or a drive (e.g., a disk drive, etc.). Electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 526 may include one or more virtual storage resources (e.g., cloud storage, a virtual private network, and/or other virtual storage resources). Electronic storage 526 may store software algorithms, information determined by processor(s) 528, information received from server(s) 502, information received from client computing platform(s) 504, and/or other information that enables server(s) 502 to function as described herein.

Processor(s) 528 may be configured to provide information processing capabilities in server(s) 502. As such, processor(s) 528 may include one or more of a digital processor, an analog processor, a digital circuit designed to process information, an analog circuit designed to process information, a state machine, and/or other mechanisms for electronically processing information. Although processor(s) 528 is shown in FIG. 5 as a single entity, this is for illustrative purposes only. In some implementations, processor(s) 528 may include a plurality of processing units. These processing units may be physically located within the same device, or processor(s) 528 may represent processing functionality of a plurality of devices operating in coordination. Processor(s) 528 may be configured to execute modules 508, 510, 512, 514, 516, 518, 520, 522, and/or other modules. Processor(s) 528 may be configured to execute modules 508, 510, 512, 514, 516, 518, 520, 522, and/or other modules by software; hardware; firmware; some combination of software, hardware, and/or firmware; and/or other mechanisms for configuring processing capabilities on processor(s) 528.

As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, and 522 are illustrated in FIG. 5 as being implemented within a single processing unit, in implementations in which processor(s) 528 includes multiple processing units, one or more of modules 508, 510, 512, 514, 516, 518, 520, and/or 522 may be implemented remotely from the other modules. The description of the functionality provided by the different modules 508, 510, 512, 514, 516, 518, 520, and/or 522 described below is for illustrative purposes, and is not intended to be limiting, as any of modules 508, 510, 512, 514, 516, 518, 520, and/or 522 may provide more or less functionality than is described. For example, one or more of modules 508, 510, 512, 514, 516, 518, 520, and/or 522 may be eliminated, and some or all of its functionality may be provided by other ones of modules 508, 510, 512, 514, 516, 518, 520, and/or 522. As another example, processor(s) 528 may be configured to execute one or more additional modules that may perform some or all of the functionality attributed below to one of modules 508, 510, 512, 514, 516, 518, 520, and/or 522.

Figure 6:
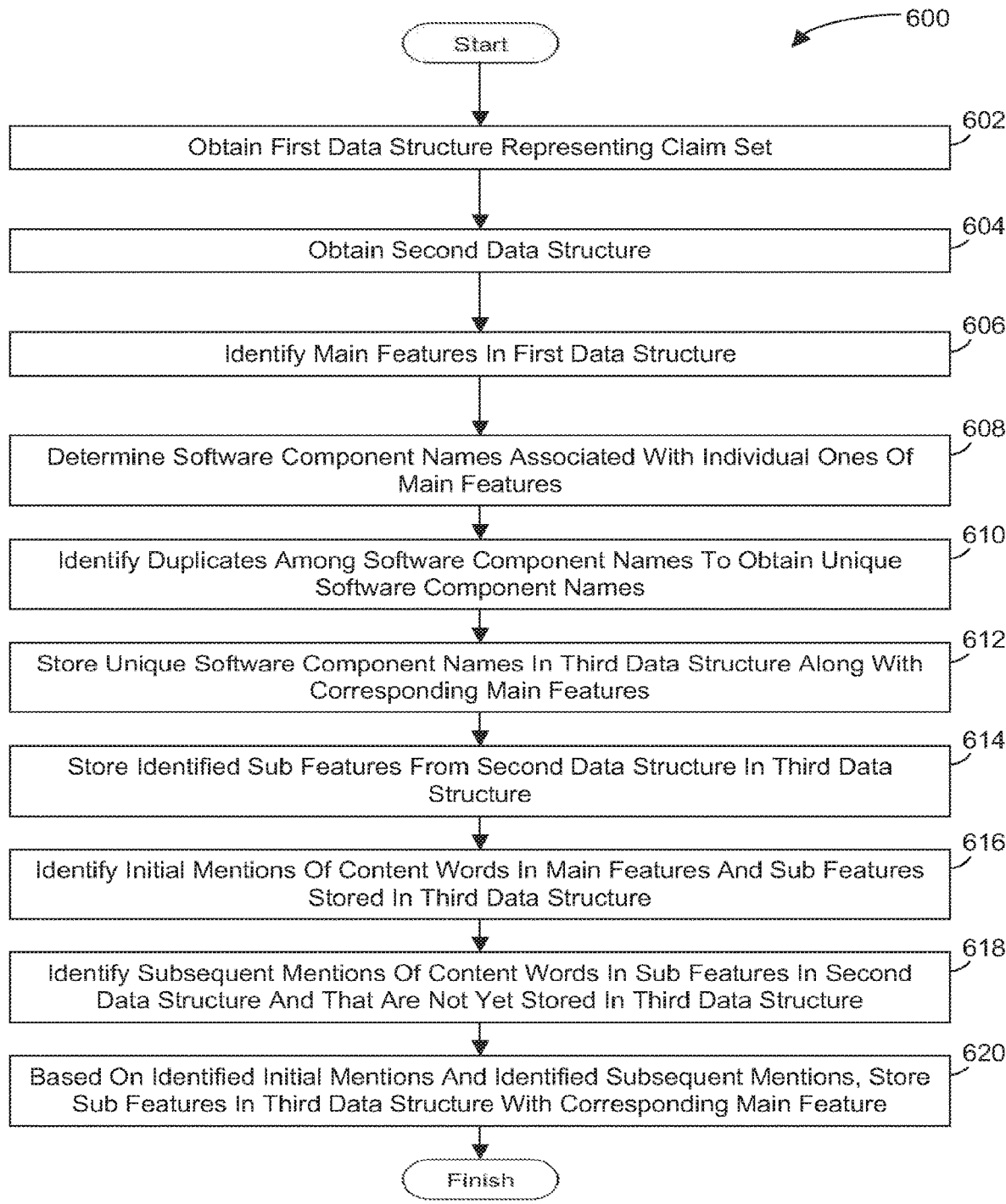
FIG. 6 illustrates a method for providing a data structure with ordered content derived from patent claims, in accordance with one or more implementations.

FIG. 6 illustrates a method 600 for providing a data structure with ordered content derived from patent claims, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include obtaining a first data structure representing a claim set. The first data structure may include language units from the claim set. The language units may be in patentese. Operation 602 may be performed by one or more hardware processors configured by machine-readable instructions including a module that is the same as or similar to data structure obtaining module 508, in accordance with one or more implementations.

An operation 604 may include obtaining a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. Operation 604 may be performed by one or more hardware processors configured by machine-readable instructions including a module that is the same as or similar to data structure obtaining module 508, in accordance with one or more implementations.

An operation 606 may include identifying main features in the first data structure. Operation 606 may be performed by one or more hardware processors configured by machine-readable instructions including a module that is the same as or similar to feature identifying module 510, in accordance with one or more implementations.

An operation 608 may include determining software component names associated with individual ones of the main features. Operation 608 may be performed by one or more hardware processors configured by machine-readable instructions including a module that is the same as or similar to software component name determination module 512, in accordance with one or more implementations.

An operation 610 may include identifying duplicates among the software component names to obtain unique software component names. Operation 610 may be performed by one or more hardware processors configured by machine-readable instructions including a module that is the same as or similar to duplicate identifying module 514, in accordance with one or more implementations.

An operation 612 may include storing the unique software component names in a third data structure along with corresponding main features such that a given main feature is associated in the third data structure with a given unique software component name. Identify sub features in the second data structure that correspond to individual ones of the main features in the first data structure. Operation 612 may be performed by one or more hardware processors configured by machine-readable instructions including a module that is the same as or similar to software component name storing module 516, in accordance with one or more implementations.

An operation 614 may include storing the identified sub features from the second data structure in the third data structure such that a given identified sub feature is associated in the third data structure with a corresponding main feature. Operation 614 may be performed by one or more hardware processors configured by machine-readable instructions including a module that is the same as or similar to sub feature storing module 518, in accordance with one or more implementations.

An operation 616 may include identifying initial mentions of content words in the main features and sub features stored in the third data structure. Operation 616 may be performed by one or more hardware processors configured by machine-readable instructions including a module that is the same as or similar to mention identifying module 520, in accordance with one or more implementations.

An operation 618 may include identifying subsequent mentions of content words in sub features in the second data structure that do not correspond to individual ones of the main features in the first data structure and that are not yet stored in the third data structure. Operation 618 may be performed by one or more hardware processors configured by machine-readable instructions including a module that is the same as or similar to mention identifying module 520, in accordance with one or more implementations.

An operation 620 may include, based on the identified initial mentions and the identified subsequent mentions, storing, in the third data structure and in association with a corresponding main feature, the sub features from the second data structure that do not correspond to individual ones of the main features in the first data structure. Operation 620 may be performed by one or more hardware processors configured by machine-readable instructions including a module that is the same as or similar to second sub feature storing module 522, in accordance with one or more implementations.

Figure 7:
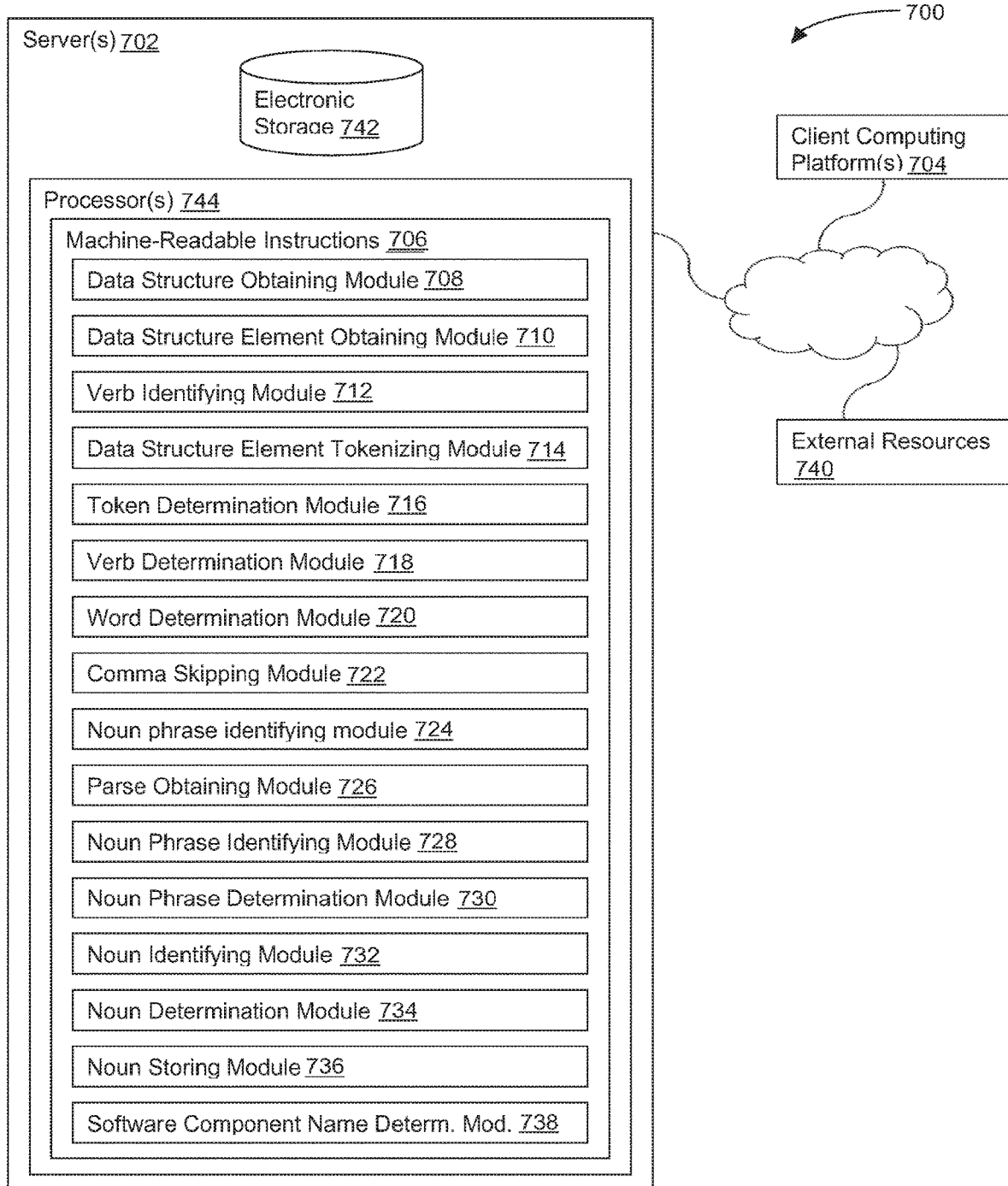
FIG. 7 illustrates a system configured for identifying and naming software components described by functional patent claim language, in accordance with one or more implementations.

FIG. 7 illustrates a system 700 configured for identifying and naming software components described by functional patent claim language, in accordance with one or more implementations. In some implementations, system 700 may include one or more servers 702. Server(s) 702 may be configured to communicate with one or more client computing platforms 704 according to a client/server architecture and/or other architectures. Client computing platform(s) 704 may be configured to communicate with other client computing platforms via server(s) 702 and/or according to a peer-to-peer architecture and/or other architectures. Users may access system 700 via client computing platform(s) 704.

Server(s) 702 may be configured by machine-readable instructions 706. Machine-readable instructions 706 may include one or more instruction modules. The instruction modules may include computer program modules. The instruction modules may include one or more of a data structure obtaining module 708, a data structure element obtaining module 710, a verb identifying module 712, a data structure element tokenizing module 714, a token determination module 716, a verb determination module 718, a word determination module 720, a comma skipping module 722, a noun phrase identifying module 724, a parse obtaining module 726, a noun phrase identifying module 728, a noun phrase determination module 730, a noun identifying module 732, a noun determination module 734, a noun storing module 736, a software component name determination module 738, and/or other instruction modules.

Data structure obtaining module 708 may be configured to obtain a data structure representing a claim set. By way of non-limiting example, a given data structure may include a specialized format for organizing and storing data, the data structure including one or more of an array, a list, two or more linked lists, a stack, a queue, a graph, a table, or a tree.

The data structure may include language units from the claim set. The language units may be organized in the data structure according to one or more classifications of individual language elements. By way of non-limiting example, the one or more classifications may include one or more of independent claim, dependent claim, preamble, main feature, sub feature, claim line, clause, phrase, or word. By way of non-limiting example, a language element may include one or more of a word, a phrase, a clause, or a sentence.

A claim may be a single sentence. A sentence may include a set of words that is complete and contains a subject and predicate. A sentence may include a main clause and optionally one or more subordinate clauses. A clause may include a unit of grammatical organization next below a sentence. A clause may include a subject and predicate. A phrase may include a small group of words standing together as a conceptual unit, a phrase forming a component of a clause. A word may include a single distinct meaningful element of language used with others to form a sentence. A word may be shown with a space on either side when written or printed.

A given main feature may include a step of a claimed process. A given sub feature may describe or expands on an aspect of a corresponding main feature. The language units may be in patentese. The patentese may include text structure and legal jargon commonly used in patent claims.

Data structure element obtaining module 710 may be configured to obtain a data structure element from the data structure. The data structure element may include a main feature. The main feature may include a step of a claimed process.

Verb identifying module 712 may be configured to identify a main verb to be associated with a software component name that corresponds to the main feature. Identifying the main verb may include identifying a present participle in the data structure element. Determining the software component name may include determining a lemma of the identified verb. Determining the software component name may include determining a nominalization of the identified verb. The main verb may describe a primary function of the main feature.

Verb identifying module 712 may be configured to, in response to a determination that the main verb has not been identified, identify the main verb.

Data structure element tokenizing module 714 may be configured to tokenize the data structure element by breaking up a stream of text in the data structure element into tokens, a given token being a word, a phrase, a symbol, or a punctuation.

Token determination module 716 may be configured to determine whether a next token is a comma.

Verb determination module 718 may be configured to, in response to a determination that the next token is not a comma, determine whether the main verb has been identified.

Word determination module 720 may be configured to, in response to a determination that the next token is a comma, determine whether a word after the comma is a trigger word.

Comma skipping module 722 may be configured to, in response to a determination that the word after the comma is a trigger word, skip to a next comma in the data structure element. The trigger word may be a word that identifies a phrase that qualifies the main feature. By way of non-limiting example, the trigger word may include one or more of by, if, after, when, based, at, upon, in, in response, while, for, during, on, prior, subsequent, from, with, using, to, or via.

Noun phrase identifying module 724 may be configured to, in response to identify the main verb, identifying a noun or noun phrase to be associated with the software component name.

Parse obtaining module 726 may be configured to obtain a parse of the tokenized data structure element. By way of non-limiting example, the parse of the tokenized data structure element may include one or more of grammatical constituents, parts of speech, syntactic relations, or inflectional form.

Noun phrase identifying module 728 may be configured to, based on the parse, identify a noun phrase that follows the main verb in the data structure element.

Noun phrase determination module 730 may be configured to determine whether the identified noun phrase is a terminal noun phrase or a parent of a qualifier phrase.

Noun identifying module 732 may be configured to, in response to a determination that the identified noun phrase is a terminal noun phrase or a parent of a qualifier phrase, identify one or more nouns in the identified noun phrase. The terminal noun phrase may be a noun phrase that lacks smaller constituent phrases. The qualifier phrase may be a phrase that precedes an adjective or adverb.

Noun determination module 734 may be configured to determine whether any nouns were identified in the identified noun phrase.

Noun storing module 736 may be configured to, in response to a determination that one or more nouns were identified in the identified noun phrase, store the one or more nouns to be used in determining the software component name.

Software component name determination module 738 may be configured to determine the software component name based on the identified main verb and the identified noun or noun phrase. By way of non-limiting example, determining the software component name may include listing the identified noun or noun phrase, listing the identified verb, and listing a term describing a type of software component.

In some implementations, one or more operations may include applying a machine learning model. In some implementations, by way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

In some implementations, server(s) 702, client computing platform(s) 704, and/or external resources 740 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 702, client computing platform(s) 704, and/or external resources 740 may be operatively linked via some other communication media.

A given client computing platform 704 may include one or more processors configured to execute computer program modules. The computer program modules may be configured to enable an expert or user associated with the given client computing platform 704 to interface with system 700 and/or external resources 740, and/or provide other functionality attributed herein to client computing platform(s) 704. By way of non-limiting example, the given client computing platform 704 may include one or more of a desktop computer, a laptop computer, a handheld computer, a tablet computing platform, a NetBook, a Smartphone, a gaming console, and/or other computing platforms.

External resources 740 may include sources of information outside of system 700, external entities participating with system 700, and/or other resources. In some implementations, some or all of the functionality attributed herein to external resources 740 may be provided by resources included in system 700.

Server(s) 702 may include electronic storage 742, one or more processors 744, and/or other components. Server(s) 702 may include communication lines, or ports to enable the exchange of information with a network and/or other computing platforms. Illustration of server(s) 702 in FIG. 7 is not intended to be limiting. Server(s) 702 may include a plurality of hardware, software, and/or firmware components operating together to provide the functionality attributed herein to server(s) 702. For example, server(s) 702 may be implemented by a cloud of computing platforms operating together as server(s) 702.

Electronic storage 742 may comprise non-transitory storage media that electronically stores information. The electronic storage media of electronic storage 742 may include one or both of system storage that is provided integrally (i.e., substantially non-removable) with server(s) 702 and/or removable storage that is removably connectable to server(s) 702 via, for example, a port (e.g., a USB port, a firewire port, etc.) or a drive (e.g., a disk drive, etc.). Electronic storage 742 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 742 may include one or more virtual storage resources (e.g., cloud storage, a virtual private network, and/or other virtual storage resources). Electronic storage 742 may store software algorithms, information determined by processor(s) 744, information received from server(s) 702, information received from client computing platform(s) 704, and/or other information that enables server(s) 702 to function as described herein.

Processor(s) 744 may be configured to provide information processing capabilities in server(s) 702. As such, processor(s) 744 may include one or more of a digital processor, an analog processor, a digital circuit designed to process information, an analog circuit designed to process information, a state machine, and/or other mechanisms for electronically processing information. Although processor(s) 744 is shown in FIG. 7 as a single entity, this is for illustrative purposes only. In some implementations, processor(s) 744 may include a plurality of processing units. These processing units may be physically located within the same device, or processor(s) 744 may represent processing functionality of a plurality of devices operating in coordination. Processor(s) 744 may be configured to execute modules 708, 710, 712, 714, 716, 718, 720, 722, 724, 726, 728, 730, 732, 734, 736, 738, and/or other modules. Processor(s) 744 may be configured to execute modules 708, 710, 712, 714, 716, 718, 720, 722, 724, 726, 728, 730, 732, 734, 736, 738, and/or other modules by software; hardware; firmware; some combination of software, hardware, and/or firmware; and/or other mechanisms for configuring processing capabilities on processor(s) 744. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, 714, 716, 718, 720, 722, 724, 726, 728, 730, 732, 734, 736, and 738 are illustrated in FIG. 7 as being implemented within a single processing unit, in implementations in which processor(s) 744 includes multiple processing units, one or more of modules 708, 710, 712, 714, 716, 718, 720, 722, 724, 726, 728, 730, 732, 734, 736, and/or 738 may be implemented remotely from the other modules. The description of the functionality provided by the different modules 708, 710, 712, 714, 716, 718, 720, 722, 724, 726, 728, 730, 732, 734, 736, and/or 738 described below is for illustrative purposes, and is not intended to be limiting, as any of modules 708, 710, 712, 714, 716, 718, 720, 722, 724, 726, 728, 730, 732, 734, 736, and/or 738 may provide more or less functionality than is described. For example, one or more of modules 708, 710, 712, 714, 716, 718, 720, 722, 724, 726, 728, 730, 732, 734, 736, and/or 738 may be eliminated, and some or all of its functionality may be provided by other ones of modules 708, 710, 712, 714, 716, 718, 720, 722, 724, 726, 728, 730, 732, 734, 736, and/or 738. As another example, processor(s) 744 may be configured to execute one or more additional modules that may perform some or all of the functionality attributed below to one of modules 708, 710, 712, 714, 716, 718, 720, 722, 724, 726, 728, 730, 732, 734, 736, and/or 738.

Figure 8:
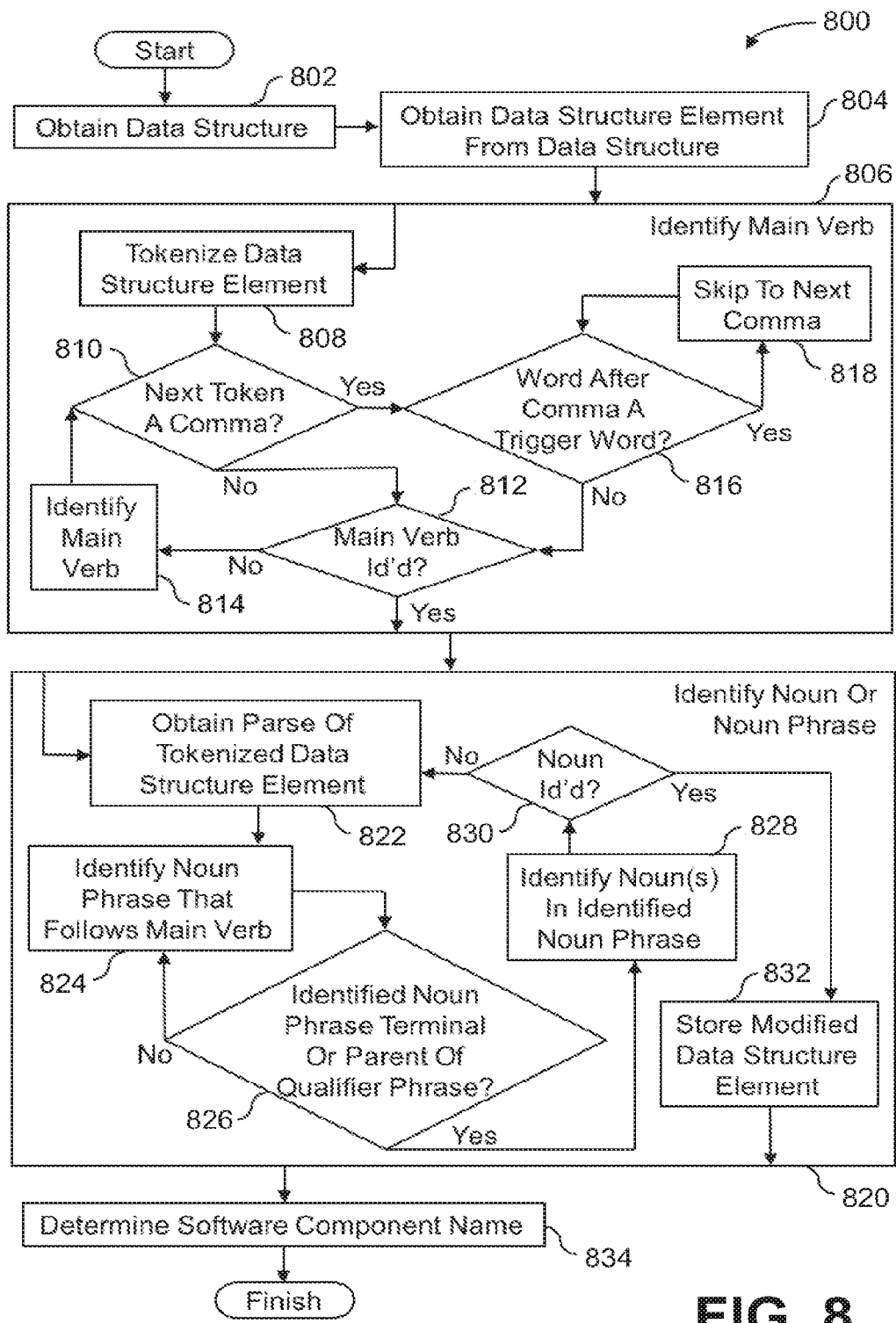
FIG. 8 illustrates a method for identifying and naming software components described by functional patent claim language, in accordance with one or more implementations.

FIG. 8 illustrates a method 800 for identifying and naming software components described by functional patent claim language, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

An operation 802 may include obtaining a data structure representing a claim set. The data structure may include language units from the claim set. The language units may be in patentese. Operation 802 may be performed by one or more hardware processors configured by machine-readable instructions including a module that is the same as or similar to data structure obtaining module 708, in accordance with one or more implementations.

An operation 804 may include obtaining a data structure element from the data structure. The data structure element may include a main feature. The main feature may include a step of a claimed process. Operation 804 may be performed by one or more hardware processors configured by machine-readable instructions including a module that is the same as or similar to data structure element obtaining module 710, in accordance with one or more implementations.

An operation 806 may include identifying a main verb to be associated with a software component name that corresponds to the main feature. The main verb may describe a primary function of the main feature. Operation 806 may be performed by one or more hardware processors configured by machine-readable instructions including a module that is the same as or similar to verb identifying module 712, in accordance with one or more implementations.

An operation 808 may include tokenizing the data structure element by breaking up a stream of text in the data structure element into tokens, a given token being a word, a phrase, a symbol, or a punctuation. Operation 808 may be performed by one or more hardware processors configured by machine-readable instructions including a module that is the same as or similar to data structure element tokenizing module 714, in accordance with one or more implementations.

An operation 810 may include determining whether a next token is a comma. Operation 810 may be performed by one or more hardware processors configured by machine-readable instructions including a module that is the same as or similar to token determination module 716, in accordance with one or more implementations.

An operation 812 may include, in response to a determination that the next token is not a comma, determining whether the main verb has been identified. Operation 812 may be performed by one or more hardware processors configured by machine-readable instructions including a module that is the same as or similar to verb determination module 718, in accordance with one or more implementations.

An operation 814 may include, in response to a determination that the main verb has not been identified, identifying the main verb. Operation 814 may be performed by one or more hardware processors configured by machine-readable instructions including a module that is the same as or similar to verb identifying module 712, in accordance with one or more implementations.

An operation 816 may include, in response to a determination that the next token is a comma, determining whether a word after the comma is a trigger word. Operation 816 may be performed by one or more hardware processors configured by machine-readable instructions including a module that is the same as or similar to word determination module 720, in accordance with one or more implementations.

An operation 818 may include, in response to a determination that the word after the comma is a trigger word, skipping to a next comma in the data structure element. Operation 818 may be performed by one or more hardware processors configured by machine-readable instructions including a module that is the same as or similar to comma skipping module 722, in accordance with one or more implementations.

An operation 820 may include, in response to identifying the main verb, identifying a noun or noun phrase to be associated with the software component name. Operation 820 may be performed by one or more hardware processors configured by machine-readable instructions including a module that is the same as or similar to noun phrase identifying module 724, in accordance with one or more implementations.

An operation 822 may include obtaining a parse of the tokenized data structure element. Operation 822 may be performed by one or more hardware processors configured by machine-readable instructions including a module that is the same as or similar to parse obtaining module 726, in accordance with one or more implementations.

An operation 824 may include, based on the parse, identifying a noun phrase that follows the main verb in the data structure element. Operation 824 may be performed by one or more hardware processors configured by machine-readable instructions including a module that is the same as or similar to noun phrase identifying module 728, in accordance with one or more implementations.

An operation 826 may include determining whether the identified noun phrase is a terminal noun phrase or a parent of a qualifier phrase. Operation 826 may be performed by one or more hardware processors configured by machine-readable instructions including a module that is the same as or similar to noun phrase determination module 730, in accordance with one or more implementations.

An operation 828 may include, in response to a determination that the identified noun phrase is a terminal noun phrase or a parent of a qualifier phrase, identifying one or more nouns in the identified noun phrase. Operation 828 may be performed by one or more hardware processors configured by machine-readable instructions including a module that is the same as or similar to noun identifying module 732, in accordance with one or more implementations.

An operation 830 may include determining whether any nouns were identified in the identified noun phrase. Operation 830 may be performed by one or more hardware processors configured by machine-readable instructions including a module that is the same as or similar to noun determination module 734, in accordance with one or more implementations.

An operation 832 may include, in response to a determination that one or more nouns were identified in the identified noun phrase, storing the one or more nouns to be used in determining the software component name. Operation 832 may be performed by one or more hardware processors configured by machine-readable instructions including a module that is the same as or similar to noun storing module 736, in accordance with one or more implementations.

An operation 834 may include determining the software component name based on the identified main verb and the identified noun or noun phrase. Operation 834 may be performed by one or more hardware processors configured by machine-readable instructions including a module that is the same as or similar to software component name determination module 738, in accordance with one or more implementations.

Figure 9:
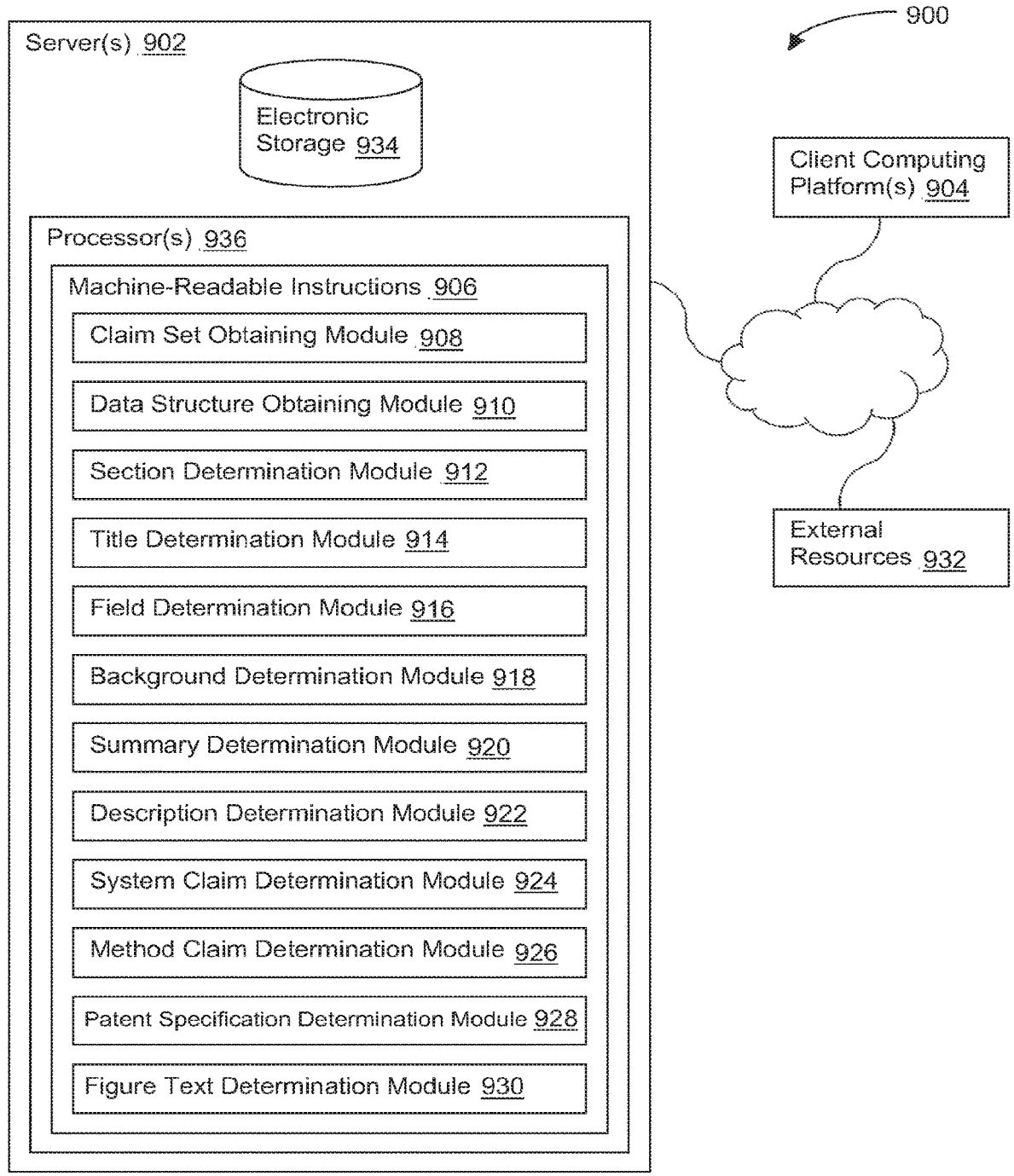
FIG. 9 illustrates a system configured for using machine learning and rules-based algorithms to create a patent specification based on human-provided patent claims such that the patent specification is created without human intervention, in accordance with one or more implementations.

FIG. 9 illustrates a system 900 configured for using machine learning and rules-based algorithms to create a patent specification based on human-provided patent claims such that the patent specification is created without human intervention, in accordance with one or more implementations. In some implementations, system 900 may include one or more servers 902. Server(s) 902 may be configured to communicate with one or more client computing platforms 904 according to a client/server architecture and/or other architectures. Client computing platform(s) 904 may be configured to communicate with other client computing platforms via server(s) 902 and/or according to a peer-to-peer architecture and/or other architectures. Users may access system 900 via client computing platform(s) 904.

Server(s) 902 may be configured by machine-readable instructions 906. Machine-readable instructions 906 may include one or more instruction modules. The instruction modules may include computer program modules. The instruction modules may include one or more of a claim set obtaining module 908, a data structure obtaining module 910, a title determination module 912, a field determination module 914, a background determination module 916, a summary determination module 918, a description determination module 920, a system claim determination module 922, a method claim determination module 924, a patent specification determination module 926, a figure text determination module 928, and/or other instruction modules.

Claim set obtaining module 908 may be configured to obtain a claim set. The claim set was prepared by a human. The claim set may include a numbered list of sentences that precisely define an invention. The claim set may include an independent claim and one or more dependent claims. Each dependent claim in the claim set may depend on the independent claim by referring to the independent claim or an intervening dependent claim.

Data structure obtaining module 910 may be configured to obtain a first data structure representing the claim set. In some implementations, by way of non-limiting example, a given data structure may include a specialized format for organizing and storing data, the data structure including one or more of an array, a list, two or more linked lists, a stack, a queue, a graph, a table, or a tree.

The first data structure may include language units from the claim set. The language units may be in patentese. The patentese may include text structure and legal jargon commonly used in patent claims.

By way of non-limiting example, a language element may include one or more of a word, a phrase, a clause, or a sentence. A claim may be a single sentence. By way of non-limiting example, a sentence may include a set of words that is complete and contains a subject and predicate, a sentence including a main clause and optionally one or more subordinate clauses. By way of non-limiting example, a clause may include a unit of grammatical organization next below a sentence, a clause including a subject and predicate. A phrase may include a small group of words standing together as a conceptual unit, a phrase forming a component of a clause. By way of non-limiting example, a word may include a single distinct meaningful element of language used with others to form a sentence, a word being shown with a space on either side when written or printed.

The language units may be organized in the first data structure according to one or more classifications of individual language elements. By way of non-limiting example, the one or more classifications may include one or more of independent claim, dependent claim, preamble, main feature, sub feature, claim line, clause, phrase, or word. In some implementations, a given main feature may include a step of a claimed process. In some implementations, a given sub feature may correspond to a given main feature. In some implementations, a given sub feature may describe or expands on an aspect of a corresponding main feature.

Data structure obtaining module 910 may be configured to obtain a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. In some implementations, prose may include an ordinary form of written language, without structure of claim language, as distinguished from patentese. The prose may include permissive prose. In some implementations, the permissive prose conveying allowed but not obligatory concepts.

In some implementations, the ordered content may include one or more software component names. In some implementations, a given software component name may describe a functional aspect of a software program. In some implementations, the ordered content may be arranged according to the one or more software components. In some implementations, a given software component may be associated with one or more main features. The one or more main features may be obtained from the first data structure. In some implementations, a given software component may be associated with one or more sub features. The one or more sub features may be obtained from the second data structure.

Data structure obtaining module 910 may be configured to obtain a third data structure. The third data structure may include ordered content derived from the claim set. By way of non-limiting example, the ordered content of the third data structure may be ordered based on one or more of claim structure of the claim set, antecedent basis in the claim set, or claim dependency in the claim set.

Title determination module 912 may be configured to determine a title of the patent specification. The title may be determined based on a preamble base stored in the second data structure. The preamble base may include the claim preamble without leading generic terms or transition words. By way of non-limiting example, a leading generic term may include system, method, device, apparatus, or composition. By way of non-limiting example, a transition word may include including, including, or consisting. The title may be determined based on a preamble base stored in the second data structure in combination with one or more leading generic terms and one or more transition words.

Field determination module 914 may be configured to determine a field of disclosure of the patent specification. The field of disclosure may be determined based on a preamble base stored in the second data structure. The field of disclosure may be determined based on a preamble base stored in the second data structure in combination with one or more leading generic terms and one or more transition words.

Background determination module 916 may be configured to determine a background of the patent specification. The background may be determined based on information provided in an invention disclosure from one or more inventors. The invention disclosure may be obtained separately from the claim set. By way of non-limiting example, the background may be determined based on one or more of the first data structure, the second data structure, or the third data structure. By way of non-limiting example, the background may be determined based on information obtained from a website, an article, a news article, a journal article, or online publication. The background may be intentionally left blank for post editing.

Summary determination module 918 may be configured to determine a summary of the patent specification. By way of non-limiting example, the summary may include a first summary portion, a second summary portion, and a third summary portion. The first summary portion may be associated with an independent system claim. The first summary portion may be determined based on the first data structure and the second data structure. The second summary portion may be associated with an independent method of claim. The second summary portion may be determined based on the first data structure and the second data structure. The third summary portion may include boilerplate language associated with summary.

Description determination module 920 may be configured to determine a brief description of the drawings of the patent specification. The brief description of the drawings may be determined based on a preamble base stored in the second data structure. The brief description of the drawings may be determined based on a preamble base stored in the second data structure in combination with one or more leading generic terms.

Description determination module 920 may be configured to determine a detailed description of the patent specification. The detailed description may include a first description portion and a second description portion. The first description portion may be associated with a system claim set. The first description portion may be determined based on the third data structure. The first description portion may be not determined based on the first data structure or the second data structure. The first description portion may include boilerplate text associated with the first description portion. The second description portion may be associated with a method of claim set. By way of non-limiting example, the second description portion may be determined based on the first data structure, the second data structure, and the third data structure. The second description portion may include boilerplate text associated with the second description portion.

System claim determination module 922 may be configured to determine system claims for the patent specification. The system claims may be determined based on the first data structure and the second data structure.

Method claim determination module 924 may be configured to determine method of claims for the patent specification. The method of claims may be determined based on the first data structure.

Patent specification determination module 926 may be configured to determine an abstract for the patent specification. The abstract may be determined based on the first data structure and the second data structure.

Figure text determination module 928 may be configured to determine figure text for the patent specification. The figure text may include first figure text and second figure text. In some implementations, the first figure text may be associated with a first figure. The first figure may illustrate a system. The first figure text may be determined based on the third data structure. In some implementations, the second figure text may be associated with a second figure. The second figure may illustrate a method. The second figure text may be determined based on the second data structure.

In some implementations, one or more operations may include applying a machine learning model. In some implementations, by way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm.

In some implementations, server(s) 902, client computing platform(s) 904, and/or external resources 930 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 902, client computing platform(s) 904, and/or external resources 930 may be operatively linked via some other communication media.

A given client computing platform 904 may include one or more processors configured to execute computer program modules. The computer program modules may be configured to enable an expert or user associated with the given client computing platform 904 to interface with system 900 and/or external resources 930, and/or provide other functionality attributed herein to client computing platform(s) 904. By way of non-limiting example, the given client computing platform 904 may include one or more of a desktop computer, a laptop computer, a handheld computer, a tablet computing platform, a NetBook, a Smartphone, a gaming console, and/or other computing platforms.

External resources 930 may include sources of information outside of system 900, external entities participating with system 900, and/or other resources. In some implementations, some or all of the functionality attributed herein to external resources 930 may be provided by resources included in system 900.

Server(s) 902 may include electronic storage 932, one or more processors 934, and/or other components. Server(s) 902 may include communication lines, or ports to enable the exchange of information with a network and/or other computing platforms. Illustration of server(s) 902 in FIG. 9 is not intended to be limiting. Server(s) 902 may include a plurality of hardware, software, and/or firmware components operating together to provide the functionality attributed herein to server(s) 902. For example, server(s) 902 may be implemented by a cloud of computing platforms operating together as server(s) 902.

Electronic storage 932 may comprise non-transitory storage media that electronically stores information. The electronic storage media of electronic storage 932 may include one or both of system storage that is provided integrally (i.e., substantially non-removable) with server(s) 902 and/or removable storage that is removably connectable to server(s) 902 via, for example, a port (e.g., a USB port, a firewire port, etc.) or a drive (e.g., a disk drive, etc.). Electronic storage 932 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 932 may include one or more virtual storage resources (e.g., cloud storage, a virtual private network, and/or other virtual storage resources). Electronic storage 932 may store software algorithms, information determined by processor(s) 934, information received from server(s) 902, information received from client computing platform(s) 904, and/or other information that enables server(s) 902 to function as described herein.

Processor(s) 934 may be configured to provide information processing capabilities in server(s) 902. As such, processor(s) 934 may include one or more of a digital processor, an analog processor, a digital circuit designed to process information, an analog circuit designed to process information, a state machine, and/or other mechanisms for electronically processing information. Although processor(s) 934 is shown in FIG. 9 as a single entity, this is for illustrative purposes only. In some implementations, processor(s) 934 may include a plurality of processing units. These processing units may be physically located within the same device, or processor(s) 934 may represent processing functionality of a plurality of devices operating in coordination. Processor(s) 934 may be configured to execute modules 908, 910, 912, 914, 916, 918, 920, 922, 924, 926, 928, and/or other modules. Processor(s) 934 may be configured to execute modules 908, 910, 912, 914, 916, 918, 920, 922, 924, 926, 928, and/or other modules by software; hardware; firmware; some combination of software, hardware, and/or firmware; and/or other mechanisms for configuring processing capabilities on processor(s) 934. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, 920, 922, 924, 926, and 928 are illustrated in FIG. 9 as being implemented within a single processing unit, in implementations in which processor(s) 934 includes multiple processing units, one or more of modules 908, 910, 912, 914, 916, 918, 920, 922, 924, 926, and/or 928 may be implemented remotely from the other modules. The description of the functionality provided by the different modules 908, 910, 912, 914, 916, 918, 920, 922, 924, 926, and/or 928 described below is for illustrative purposes, and is not intended to be limiting, as any of modules 908, 910, 912, 914, 916, 918, 920, 922, 924, 926, and/or 928 may provide more or less functionality than is described. For example, one or more of modules 908, 910, 912, 914, 916, 918, 920, 922, 924, 926, and/or 928 may be eliminated, and some or all of its functionality may be provided by other ones of modules 908, 910, 912, 914, 916, 918, 920, 922, 924, 926, and/or 928. As another example, processor(s) 934 may be configured to execute one or more additional modules that may perform some or all of the functionality attributed below to one of modules 908, 910, 912, 914, 916, 918, 920, 922, 924, 926, and/or 928.

Figure 10:
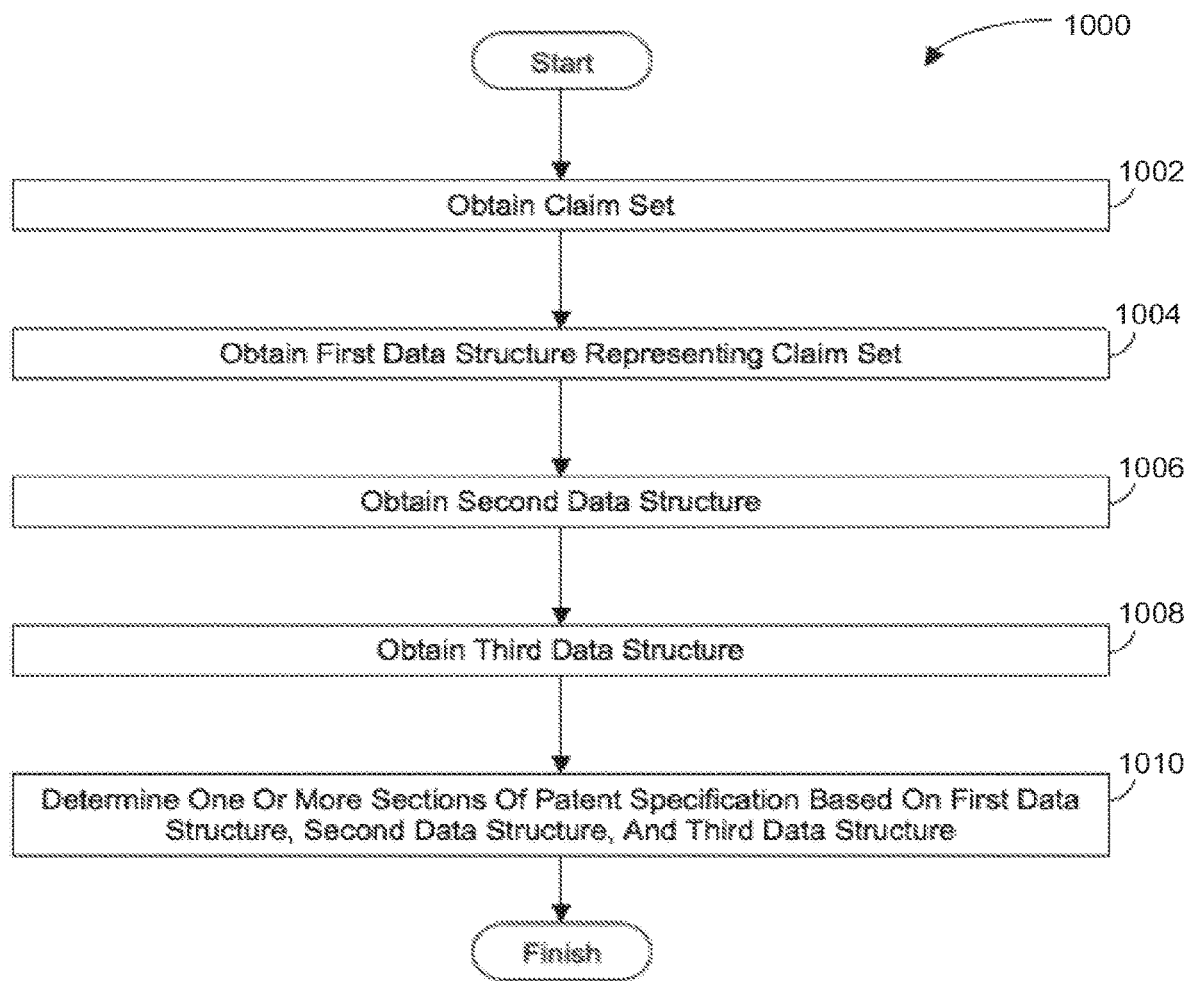
FIG. 10 illustrates a method for using machine learning and rules-based algorithms to create a patent specification based on human-provided patent claims such that the patent specification is created without human intervention, in accordance with one or more implementations.

FIG. 10 illustrates a method 1000 for using machine learning and rules-based algorithms to create a patent specification based on human-provided patent claims such that the patent specification is created without human intervention, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

An operation 1002 may include obtaining a claim set. The claim set may include a numbered list of sentences that precisely define an invention. The claim set may include an independent claim and one or more dependent claims, each dependent claim in the claim set depending on the independent claim by referring to the independent claim or an intervening dependent claim. The claim set was prepared by a human. Operation 1002 may be performed by one or more hardware processors configured by machine-readable instructions including a module that is the same as or similar to claim set obtaining module 908, in accordance with one or more implementations.

An operation 1004 may include obtaining a first data structure representing the claim set. The first data structure may include language units from the claim set. The language units may be in patentese. Operation 1004 may be performed by one or more hardware processors configured by machine-readable instructions including a module that is the same as or similar to data structure obtaining module 910, in accordance with one or more implementations.

An operation 1006 may include obtaining a second data structure. The second data structure may have the same dimensions as the first data structure such that a given data structure element at a given position within the first data structure corresponds to a given data structure element at the same position within the second data structure. The second data structure may include language elements associated with the claim set. The language elements of the second data structure may be in prose rather than patentese. Operation 1006 may be performed by one or more hardware processors configured by machine-readable instructions including a module that is the same as or similar to data structure obtaining module 910, in accordance with one or more implementations.

An operation 1008 may include obtaining a third data structure. The third data structure may include ordered content derived from the claim set. The ordered content of the third data structure may be ordered based on one or more of claim structure of the claim set, antecedent basis in the claim set, or claim dependency in the claim set. Operation 1008 may be performed by one or more hardware processors configured by machine-readable instructions including a module that is the same as or similar to data structure obtaining module 910, in accordance with one or more implementations.

An operation 1010 may include determining one or more sections of the patent specification based on the first data structure, the second data structure, and the third data structure. Operation 1010 may be performed by one or more hardware processors configured by machine-readable instructions including a module that is the same as or similar to one or more of title determination module 912, field determination module 914, background determination module 916, summary determination module 918, description determination module 920, system claim determination module 922, method claim determination module 924, patent specification determination module 926, and/or figure text determination module 928, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to automatically convert patent claim language into prose, the system comprising:
   one or more hardware processors configured by machine-readable instructions to:
      obtain at least a portion of a patent claim, the patent claim being a numbered sentence that precisely defines an invention;
      determine, based on the at least the portion of the patent claim, a first data structure representing the at least the portion of the patent claim, the first data structure including a first data structure element, the first data structure element including one or more language units from the at least the portion of the patent claim, wherein an individual language unit of the first data structure includes one or more clauses;
      tokenize the first data structure element into tokens by breaking up a stream of text in the first data structure to generate a tokenized first data structure element, wherein a given token includes a word, a phrase, a symbol, or a punctuation;
      obtain, through a first machine learning model, a parse of the tokenized first data structure element, the parse of the tokenized first data structure element including one or more of grammatical constituents, parts of speech, syntactic relations, or inflectional form; and determine, based on one or both of the at least the portion of the patent claim or the first data structure, a second data structure, the second data structure including a second data structure element, the second data structure element including one or more language units associated with the at least the portion of the patent claim, an individual language unit of the second data structure being in prose, wherein prose includes an ordinary form of written language, wherein the individual language unit in the first data structure is transformed into a corresponding language unit in the second data structure based on a computerized natural language generation operation using one or both of a second machine learning model or rules-based algorithms.

2. The system of claim 1, wherein the patent claim is part of a claim set, the claim set including an independent claim and zero or more dependent claims, each dependent claim in the claim set depending on the independent claim by referring to the independent claim or an intervening dependent claim.

3. The system of claim 1, wherein the one or more language units in the first data structure are organized according to one or more classifications of individual language units, wherein the one or more classifications include one or more of independent claim, dependent claim, preamble, main feature, sub feature, claim line, clause, phrase, or word.

4. The system of claim 1, wherein the first data structure and the second data structure are separate and distinct from each other.

5. The system of claim 1, wherein the computerized natural language generation operation includes one or more of paraphrase induction, simplification, compression, clause fusion, or expansion.

6. The system of claim 1, wherein the patent claim is part of a claim set, wherein the one or more hardware processors are further configured by the machine-readable instructions to determine, based on the one or more language units from the first data structure and/or the one or more language units from the second data structure, a third data structure, wherein ordered content of the third data structure is ordered based on one or more of claim structure of the claim set, antecedent basis in the claim set, or claim dependency in the claim set.

7. The system of claim 6, wherein one or more sections of a patent specification are further determined by assembling language units from the third data structure.

8. The system of claim 1, wherein an individual data structure includes a specialized format for organizing and storing data, the individual data structure including one or more of an array, a list, two or more linked lists, a stack, a queue, a graph, a table, or a tree.

9. The system of claim 1, wherein the one or more hardware processors are further configured by the machine-readable instructions to generate one or more drawing figures described in a patent specification, the one or more drawing figures being generated based on one or both of the first data structure or the second data structure.

10. A computer-implemented method to automatically convert patent claim language into prose, the method comprising:

obtaining at least a portion of a patent claim, the patent claim being a numbered sentence that precisely defines an invention;

determining, based on the at least the portion of the patent claim, a first data structure representing the at least the portion of the patent claim, the first data structure including a first data structure element, the first data structure element including one or more language units from the at least the portion of the patent claim, wherein an individual language unit of the first data structure includes one or more clauses;

tokenizing the first data structure element into tokens by breaking up a stream of text in the first data structure to generate a tokenized first data structure element, wherein a given token includes a word, a phrase, a symbol, or a punctuation;

obtaining, through a first machine learning model, a parse of the tokenized first data structure element, the parse of the tokenized first data structure element including one or more of grammatical constituents, parts of speech, syntactic relations, or inflectional form; and determining, based on one or both of the at least the portion of the patent claim or the first data structure, a second data structure, the second data structure including a second data structure element, the second data structure element including one or more language units associated with the at least the portion of the patent claim, an individual language unit of the second data structure being in prose, wherein prose includes an ordinary form of written language, wherein the individual language unit in the first data structure is transformed into a corresponding language unit in the second data structure based on a computerized natural language generation operation using one or both of a second machine learning model or rules-based algorithms.

11. The method of claim 10, wherein the patent claim is part of a claim set, the claim set including an independent claim and zero or more dependent claims, each dependent claim in the claim set depending on the independent claim by referring to the independent claim or an intervening dependent claim.

12. The method of claim 10, wherein the one or more language units in the first data structure are organized according to one or more classifications of individual language units, wherein the one or more classifications include one or more of independent claim, dependent claim, preamble, main feature, sub feature, claim line, clause, phrase, or word.

13. The method of claim 10, wherein the first data structure and the second data structure are separate and distinct from each other.

14. The method of claim 10, wherein the computerized natural language generation operation includes one or more of paraphrase induction, simplification, compression, clause fusion, or expansion.

15. The method of claim 10, wherein the patent claim is part of a claim set, and wherein the method further comprises determining, based on the one or more language units from the first data structure and/or the one or more language units from the second data structure, a third data structure, wherein ordered content of the third data structure is ordered based on one or more of claim structure of the claim set, antecedent basis in the claim set, or claim dependency in the claim set.

16. The method of claim 15, wherein one or more sections of a patent specification are further determined by assembling language units from the third data structure.

17. The method of claim 10, wherein an individual data structure includes a specialized format for organizing and storing data, the individual data structure including one or more of an array, a list, two or more linked lists, a stack, a queue, a graph, a table, or a tree.

18. The method of claim 10, further comprising generating one or more drawing figures described in a patent specification, the one or more drawing figures being generated based on one or both of the first data structure or the second data structure.

19. The system of claim 1, wherein the one or more hardware processors are further configured by the machine-readable instructions to:
   determine at least a portion of one or more sections of a patent specification by assembling the one or more language units from the first data structure and the one or more language units from the second data structure.

20. The method of claim 10, further comprising:
   determining at least a portion of one or more sections of a patent specification by assembling the one or more language units from the first data structure and the one or more language units from the second data structure.

* * * * *